US012561805B2

(12) United States Patent
Langoju et al.

(10) Patent No.: US 12,561,805 B2
(45) Date of Patent: Feb. 24, 2026

(54) METHODS AND SYSTEMS FOR GENERATING DUAL-ENERGY IMAGES FROM A SINGLE-ENERGY IMAGING SYSTEM BASED ON ANATOMICAL SEGMENTATION

(71) Applicant: GE Precision Healthcare LLC, Waukesha, WI (US)

(72) Inventors: Rajesh Langoju, Karnataka (IN); Utkarsh Agrawal, Karnataka (IN); Bipul Das, Karnataka (IN); Risa Shigemasa, Tokyo (JP); Yasuhiro Imai, Tokyo (JP); Kok Yen Tham, Tokyo (JP); Yuri Teraoka, Tokyo (JP)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 358 days.

(21) Appl. No.: 18/471,188

(22) Filed: Sep. 20, 2023

(65) Prior Publication Data

US 2025/0095143 A1     Mar. 20, 2025

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10081* (2013.01); *G06T 2207/20081* (2013.01); *G06T 2207/30004* (2013.01)

(58) Field of Classification Search
CPC ..................... G06T 7/0012; G06T 7/11; G06T 2207/10081; G06T 2207/20081; G06T 2207/30004; G06T 2211/408
See application file for complete search history.

(56) References Cited

U.S. PATENT DOCUMENTS 9,836,862 B2    12/2017    Nett et al.
10,573,028 B2    2/2020    Bhagalia et al.
(Continued)

FOREIGN PATENT DOCUMENTS

CN        107680078 A  *  2/2018  ........... G06T 11/008
CN        111179228 A  *  5/2020  ........... G06T 7/0012

OTHER PUBLICATIONS

Zhao et al., "Dual-energy CT imaging using a single-energy CT data is feasible via deep learning," 2019, arXiv, Medical Physics [online]. [retrieved on Oct. 31, 2019]. <URL: https://arxiv.org/abs/1906. 04874> (Year: 2019).*

(Continued)

*Primary Examiner* — Emily C Terrell
*Assistant Examiner* — Julia Z. Yao
(74) *Attorney, Agent, or Firm* — McCoy Russell LLP

(57) ABSTRACT

Methods and systems are provided for transforming images from one energy level to another. In an example, a method includes obtaining an image at a first energy level, identifying a contrast phase of the image, entering the image as input to a segmentation model trained to output an anatomy mask that identifies each tissue type in the image, generating a guide image from the image and the anatomy mask using a regression model, entering the image and the guide image as input into an energy transformation model trained to output a transformed image at a different, second energy level, the energy transformation model selected from among a plurality of energy transformation models based on the contrast phase, and displaying a final transformed image and/or saving the final transformed image in memory, wherein the final transformed image is the transformed image or is generated based on the transformed image.

20 Claims, 17 Drawing Sheets

(56) References Cited

U.S. PATENT DOCUMENTS

| | | | |
|---|---|---|---|
| 11,350,895 B2 | 6/2022 | Chen et al. | |
| 11,417,034 B2 | 8/2022 | Goshen et al. | |
| 2004/0102688 A1* | 5/2004 | Walker | A61B 6/032 |
| | | | 600/407 |
| 2012/0321164 A1* | 12/2012 | Eusemann | G06T 11/00 |
| | | | 382/131 |
| 2020/0294288 A1 | 9/2020 | Smith | |
| 2022/0347493 A1 | 11/2022 | Novosad et al. | |
| 2023/0008465 A1* | 1/2023 | Smith | A61B 6/481 |
| 2024/0289948 A1* | 8/2024 | Wang | G16H 50/20 |

OTHER PUBLICATIONS

Liu et al. "Generation of Brain Dual-Energy CT from Single-Energy CT Using Deep Learning." J Digit Imaging 34, 149-161 (2021). https://doi.org/10.1007/s10278-020-00414-1 (Year: 2021).*

Lyu et al., "Estimating dual-energy CT imaging from single-energy CT data with material decomposition convolutional neural network," 2021, Medical Image Analysis, vol. 70, Oct. 2001. https://doi.org/10.1016/j.media.2021.102001 (Year: 2021).*

Charyyev et al., "Learning-based synthetic dual energy CT imaging from single energy CT for stopping power ratio calculation in proton radiation therapy," British Journal of Radiology, vol. 95, Issue 1129, Jan. 1, 2022, 20210644, https://doi.org/10.1259/bjr.20210644 (Year: 2022).*

Mahmood et al., "Deep Learning and Domain-Specific Knowledge to Segment the Liver from Synthetic Dual Energy CT Iodine Scans," Diagnostics 2022, vol. 12, No. 3, article No. 672. https://doi.org/10.3390/diagnostics12030672 (Year: 2022).*

Zhou et al., "The synthesis of high-energy CT images from low-energy CT images using an improved cycle generative adversarial network," Quant Imaging Med Surg. Jan. 2022;12(1):28-42. doi: 10.21037/qims-21-182. PMID: 34993058; PMCID: PMC8666774. (Year: 2022).*

Wang et al., "Image-domain material decomposition for single-energy CT images using cascaded network," 2021 International Conference on Artificial Intelligence and Electromechanical Automation (AIEA), Guangzhou, China, 2021, pp. 273-276, doi: 10.1109/AIEA53260.2021.00064. (Year: 2021).*

Zhao et al., "Obtaining dual-energy computed tomography (CT) information from a single-energy CT image for quantitative imaging analysis of living subjects by using deep learning," Proceedings of the Pacific Symposium on Biocomputing 2020, pp. 139-148. doi: 10.1142/9789811215636_0013 (Year: 2020).*

Liu et al., "Synthetic dual-energy CT for MRI-only based proton therapy treatment planning using label-GAN," 2021 Institute of Physics and Engineering in Medicine, Phys. Med. Biol., vol. 66, No. 6, 065014. https://doi.org/10.1088/1361-6560/abe736 (Year: 2021).*

Dorn et al., "Towards context-sensitive CT imaging—organ-specific image formation for single (SECT) and dual energy computed tomography (DECT)," 2018, Med. Phys., vol. 45, issue 10, pp. 4541-4557. https://doi.org/10.1002/mp.13127 (Year: 2018).*

* cited by examiner

1500

METHODS AND SYSTEMS FOR GENERATING DUAL-ENERGY IMAGES FROM A SINGLE-ENERGY IMAGING SYSTEM BASED ON ANATOMICAL SEGMENTATION

FIELD

Embodiments of the subject matter disclosed herein relate to medical imaging, and more particularly, to computed tomography (CT).

BACKGROUND

In computed tomography (CT) imaging systems, an x-ray source emits an x-ray beam toward a subject or object, such as a patient. After attenuation by the subject, the x-ray beam impinges upon a detector array. An intensity of the attenuated beam radiation received at the detector array depends on upon attenuation of the x-ray beam by the subject. Each detector element of the detector array produces a separate electrical signal which is transmitted to a data processing system for analysis and generation of a medical image. CT scans at various energy levels may provide increased quality of tissue characterization and contrast quantification/visualization.

BRIEF DESCRIPTION

In one example, a method includes obtaining an image at a first energy level acquired with a single-energy computed tomography (CT) imaging system, identifying a contrast phase of the image, entering the image as input to a segmentation model trained to output an anatomy mask that identifies each tissue type in the image, generating a guide image from the image and the anatomy mask using a regression model, the regression model selected from among a plurality of regression models based on the contrast phase, entering the image and the guide image as input into an energy transformation model trained to output a transformed image at a second energy level, different than the first energy level, the energy transformation model selected from among a plurality of energy transformation models based on the contrast phase, and displaying a final transformed image and/or saving the final transformed image in memory, wherein the final transformed image is the transformed image or is generated based on the transformed image.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
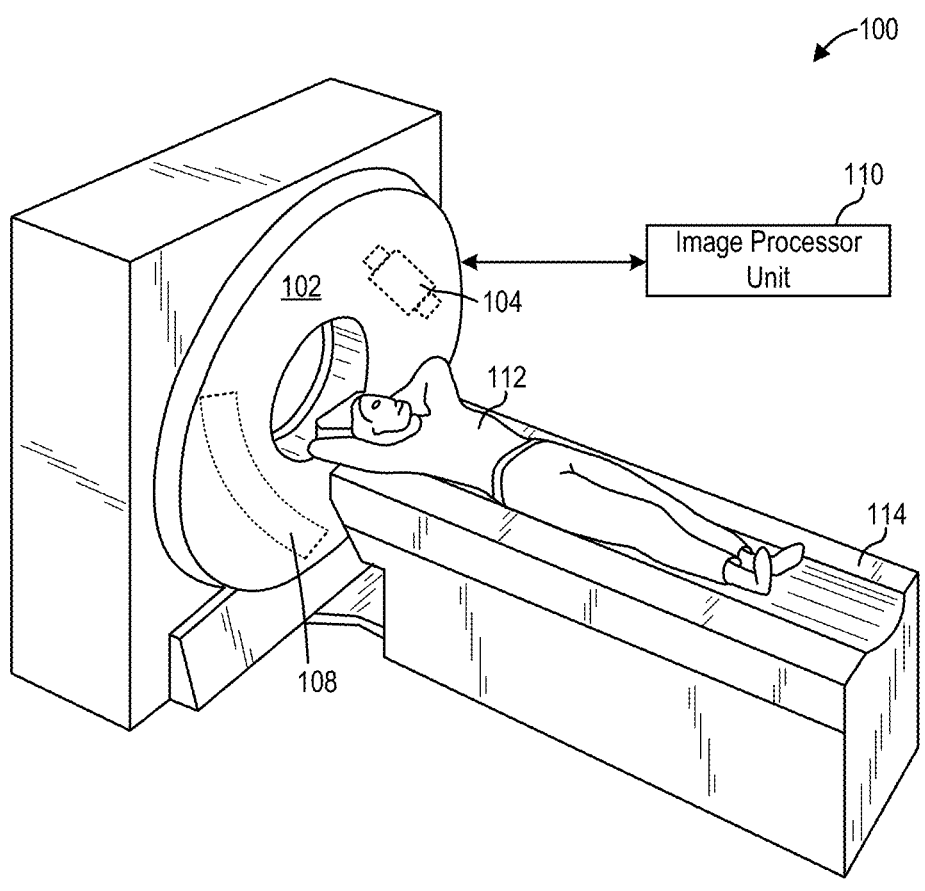
FIG. 1 shows a pictorial view of a CT imaging system that incorporates disclosed embodiments.

The following description relates to transforming images from one energy level to another energy level. In particular, the follow description relates to transforming images obtained at a single peak energy (e.g., with a single-energy spectral computed tomography (CT) system) to one or more different energy levels. Unlike single-energy CT imaging systems, projection data obtained with dual-energy CT imaging systems can be used to generate CT images at any selected energy level. For example, dual-energy CT imaging systems may obtain projection data at a first, higher peak energy level (e.g., 140 kVp) and a second, lower peak energy level (e.g., 40 kVp) in an interleaved manner or sequential manner, and virtual monochromatic images may be generated at any desired energy level (keV) between 40 keV and 140 keV by performing a linear combination of material basis images. Thus, dual-energy CT imaging systems may be beneficial for certain imaging tasks. For example, lower energy level images may increase contrast visualization of regions of interest (ROI) of a subject of the CT image, which may reduce the frequency of missed diagnoses or misdiagnoses, especially in oncological applications. However, CT images at lower energy levels are also prone to noise and image artifacts which decrease the visualization of the ROI of the subject and reduce overall image quality.

Although dual-energy CT imaging systems provide many advantages with regards to image quality, dual-energy CT imaging systems may not be available at all imaging facilities. In addition, the types of scans that dual-energy CT imaging systems can perform may be limited. While single-energy CT imaging systems may be more widespread and increase the types of scans that may be performed, the images generated from single-energy CT imaging systems may not include the increased contrast visualization described above, or conversely, lower energy CT images obtained with single-energy CT imaging systems may exhibit noise and image artifacts.

Thus, the issues described above may be addressed by transforming images obtained at a single peak energy level (e.g., 120 kVp) to one or more different energy levels, such as transforming images obtained at higher energy levels to images that appear as if obtained at lower energy levels. The images may be transformed using a deep learning-based energy transformation model trained for a specific energy transformation (e.g., trained to transform images from 70 keV to 50 keV). However, transforming images to different energy levels may be challenging. In particular, when transforming images to different energy levels, not only are contrast phase(s) transformed, but also each tissue present in the images is transformed, increasing the complexity of the image transformation process. As described in more detail below, to transform the images, the contrast value for each contrast phase, in addition to the values of water density tissue, fat density tissue, bone density tissue, and the like, is mapped from the higher energy level image to the lower energy level image, for example.

The appropriate mappings may be achieved by identifying the contrast phase(s) and tissue type(s) within an initial image to be transformed and then transforming the image to the different energy level in a contrast phase- and tissue-specific manner with a plurality of regression models and a plurality of energy transformation models. Each regression model is physics-based and corresponds to (e.g., is specific for) a specific contrast phase. A regression model may be selected based on the contrast phase included in the initial image. The contrast phase may be determined based on output from a contrast phase classifier (e.g., deep learning model) that identifies the contrast phase present in the initial image. The tissue type(s) in the initial image may be determined based on an anatomy mask output during anatomical segmentation of the initial image. Additionally, each regression model is configured to generate a guide image by performing a plurality of mappings. Each mapping includes mapping pixel intensity values for each relevant pixel in the initial image from an initial pixel intensity value at a first energy level to a final pixel intensity value at a second energy level. Relevant pixels refer to pixels corresponding to a particular tissue type (e.g., bone tissue, muscle tissue, etc.). Each mapping may be performed with regression data for a particular tissue type. A final guide image may be generated by blending guide images output from different regression models.

Each energy transformation model corresponds to (e.g., is trained for) a specific contrast phase and specific energy level transformation. The energy level transformation may include transforming the initial image obtained at a predetermined first energy level (e.g., 120 kVp, which may be equivalent to 70 keV) to a final transformed image that appears as if obtained at a pre-determined second energy level (50 keV) using the guide image. An energy transformation model may be selected based on the contrast phase of the initial image, which may also be determined based on output from the contrast phase classifier model described above. In this way, the energy transformation model may be selected based on a single contrast phase.

In some examples, the initial image may be obtained during transition from one contrast phase to another contrast phase. In such examples, the contrast phase classifier may identify more than one contrast phase (e.g., two contrast phases) in the initial image. Based on the identified contrast phases, more than one energy transformation model may be selected, e.g., an energy transformation model corresponding to each identified contrast phase. The initial image may be input to each selected energy transformation model. A respective transformed image may be output from each selected energy transformation model, each transformed image corresponding to the specific contrast phase. A final transformed image at the second energy level may be generated by blending the transformed images. Blending of the transformed images may include weighting each transformed image based on a ratio of the identified contrast phases.

In some examples, it may be desired to transform the initial image to a different energy level that is a relatively large difference in energy level, such as to an even lower energy level than the energy transformation described above, to further increase contrast visibility and visualization of the ROI of the subject. However, a quality of the transformed image may depend on a size of the energy transformation, e.g., a change in energy level between the initial energy level and the final energy level. As one example, mapping of the contrast phase and each tissue type from the initial energy level to the final energy level may be unsatisfactory when the size of the energy transformation is too large (e.g., from 120 kVp to 30 keV), which in turn, may decrease image quality of the transformed image and decrease visualization of the ROI of the subject.

Therefore, it may be beneficial to sequentially transform the initial image at the first energy level to a first transformed image at the second energy level and then transform the first transformed image to a second transformed image at a third energy level. The first transformed image may be transformed to the second transformed image at the third energy level by entering the first transformed image into an energy transformation model corresponding to a different energy level transformation (e.g., from 50 keV to 30 keV). In this way, the initial image at the first energy level may be transformed to the third energy level without reducing image quality.

FIG. 1 illustrates an exemplary CT imaging system 100 configured for CT imaging. Particularly, the CT imaging system 100 is configured to image a subject 112, such as a patient, an inanimate object such as a phantom, one or more manufactured parts, and/or foreign objects such as dental implants, artificial joints, stents, and/or contrast agents present within the body. In one embodiment, the CT imaging system 100 includes a gantry 102, which in turn, may further include at least one x-ray source 104 configured to project a beam of x-ray radiation for use in imaging the subject 112. Specifically, the x-ray source 104 is configured to project the x-rays towards a detector array 108 positioned on the opposite side of the gantry 102. Although FIG. 1 depicts a single x-ray source 104, in certain embodiments, multiple x-ray sources and detectors may be employed to project a plurality of x-rays for acquiring, for example, projection data at different energy levels corresponding to the patient. In some embodiments, the x-ray source 104 may enable dual-energy spectral imaging by rapid peak kilovoltage (kVp) switching. In some embodiments, the x-ray detector employed is a photon-counting detector that is capable of differentiating x-ray photons of different energies. In other embodiments, the x-ray detector is an energy integrating detector in which the detected signal is proportional to the total energy deposited by all photons without specific information about each individual photon or its energy. In some embodiments, two sets of x-ray sources and detectors are used to generate dual-energy projections, with one set at low-kVp and the other at high-kVp. It should thus be appreciated that the methods described herein may be implemented with single energy acquisition techniques as well as dual energy acquisition techniques to train an energy transformation deep learning (DL) model and obtain images to input into the trained energy transformation DL model.

In certain embodiments, the CT imaging system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. In some examples the image processor unit 110 may use an analytic image reconstruction approach such as FBP in addition to an iterative image reconstruction approach. In some embodiments, the image processor unit 110 may use a direct image reconstruction approach, such as using deep-learning trained neural networks.

In some CT imaging system configurations, the x-ray source 104 emits a cone-shaped beam which is collimated to lie within a plane of an X-Y-Z Cartesian coordinate system and generally referred to as an "imaging plane. The radiation beam passes through an object being imaged, such as the patient or subject 112. The beam, after being attenuated by the object, impinges upon the detector array 108 comprising radiation detectors. The intensity of the attenuated radiation beam received at the detector array 108 is dependent upon the attenuation of the radiation beam by the object. Each detector element of the array produces a separate electrical signal that is a measurement of the beam attenuation of a ray path between the source and the detector element. The attenuation measurements from all the detector elements are acquired separately to produce a transmission profile.

In some CT imaging systems, the radiation source and the detector array are rotated with a gantry within the imaging plane and around the object to be imaged such that an angle at which the radiation beam intersects the object constantly changes. A group of radiation attenuation measurements, e.g., projection data, from the detector array at one gantry angle is referred to as a "view." A "scan" of the object includes a set of views made at different gantry angles, or view angles, during one revolution of the radiation source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, a positron emission tomography (PET), a single-photon emission CT (SPECT) acquisition, and/or any other modality including modalities yet to be developed as well as combinations thereof in fused or hybrid embodiments.

The projection data is processed to reconstruct an image that corresponds to a two-dimensional slice taken through the object or, in some examples where the projection data includes multiple rotations or scans or two-dimensional (2D) arrays of detectors, a three-dimensional (3D) rendering of the object. One method for reconstructing an image from a set of projection data is referred to in the art as the filtered back projection technique. Transmission and emission tomography reconstruction techniques also include statistical iterative methods, such as maximum likelihood expectation maximization (MLEM) and ordered-subsets expectation-reconstruction techniques, as well as iterative reconstruction techniques. This process may convert the attenuation measurements from a scan into values called "CT numbers" or "Hounsfield units" (HU), which are used to control the brightness of a corresponding pixel on a display device.

To reduce the total scan time, a "helical" scan may be performed. To perform a "helical" scan, the patient is moved while the data for the prescribed number of slices are acquired. The position of the source with respect to the patient in such a system traces a helix. The helix mapped out by the source yields projection data from which images in each prescribed slice may be reconstructed.

As used herein, the phrase "reconstructing an image" is not intended to exclude embodiments of the present invention in which data representing an image are generated but a viewable image is not. Therefore, as used herein, the term "image" broadly refers to both viewable images and data representing a viewable image. However, many embodiments generate (or are configured to generate) at least one viewable image.

Figure 2:
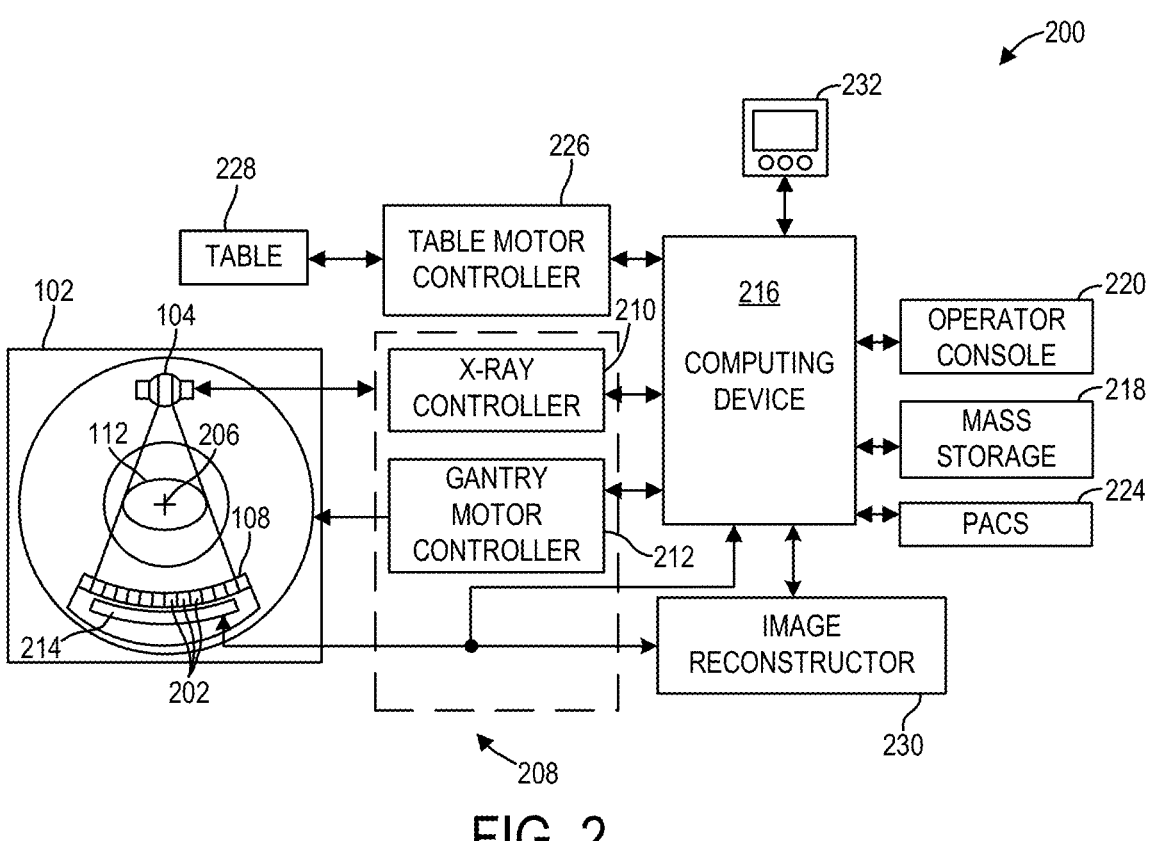
FIG. 2 shows a block schematic diagram of the system illustrated in FIG. 1.

FIG. 2 illustrates an exemplary imaging system 200 similar to the CT imaging system 100 of FIG. 1. The imaging system 200 is configured for imaging the subject 112. In one embodiment, the imaging system 200 includes the detector array 108 (see FIG. 1). The detector array 108 further includes a plurality of detector elements 202 that together sense the x-ray beams that pass through the subject 112 (such as a patient) to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 112 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 112 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 112. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density maps or images of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 112, expressed in the densities of two basis materials. The density image may be displayed to show these features. In traditional approaches to diagnosis of medical conditions, such as disease states, and more generally of medical events, a radiologist or physician may consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202. The data sampled and digitized by the DAS 214 is transmitted to a computer or computing device 216. In one example, the computing device 216 stores the data in a mass storage device or storage device 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a user interface (not shown), which may include one or more of a keyboard, a touchscreen, a mouse, a trackpad, and the like to allow the operator to specify the commands and/or scanning parameters.

Although FIG. 2 illustrates one operator console 220, although more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which, in turn, may control a table 114 (see FIG. 1) or 228 which may be a motorized table. Specifically, the table motor controller 226 may move the table 114 (see FIG. 1) or 228 for appropriately positioning the subject 112 in the gantry 102 for acquiring projection data corresponding to the target volume of the subject 112.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200, and instead, the computing device 216 may perform one or more functions of the image reconstructor 230. Moreover, the image reconstructor 230 may be located locally or remotely and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

Figure 3:
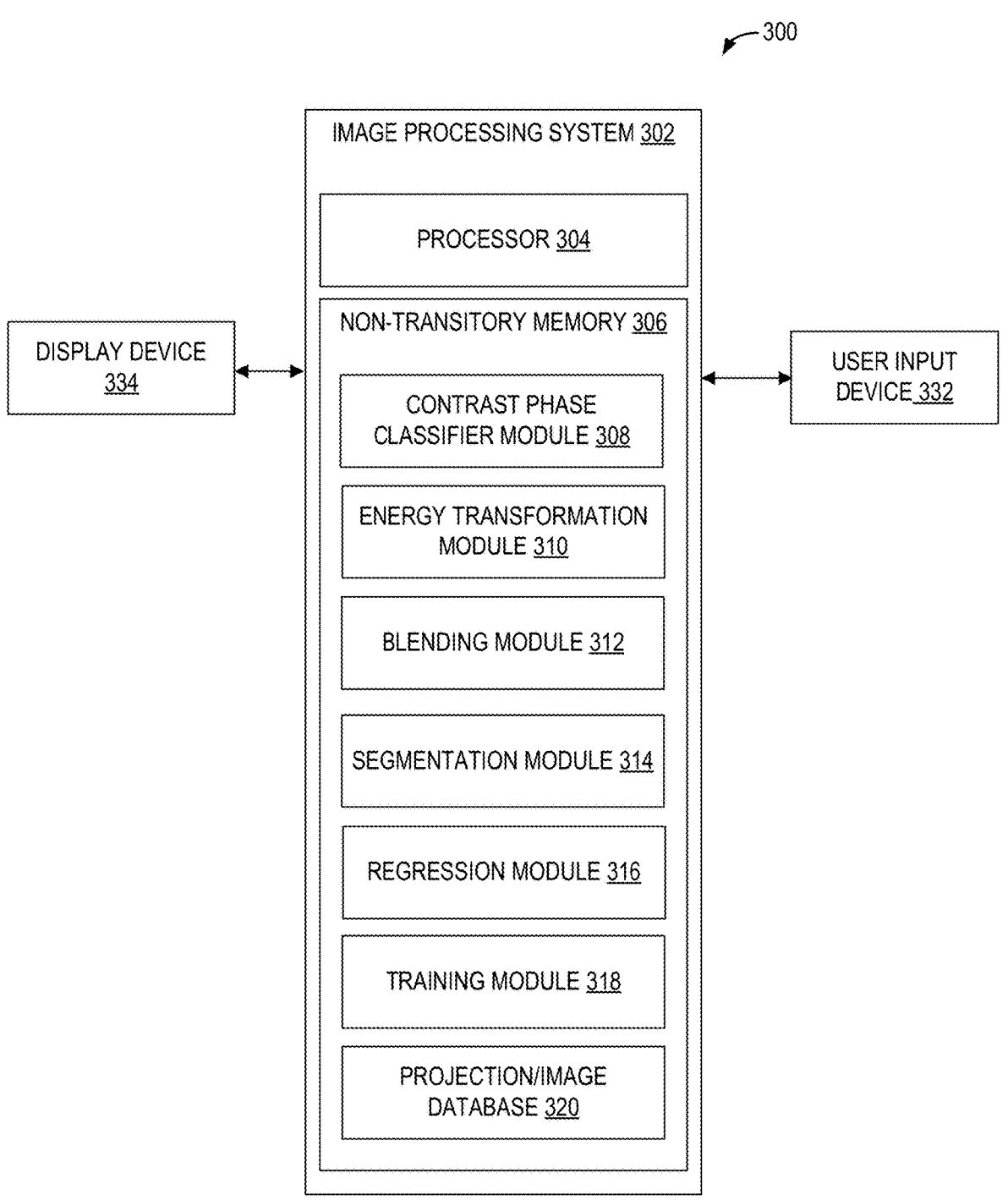
FIG. 3 schematically shows an example image processing system.

Referring to FIG. 3, image processing system 302 configured to receive projection data is shown. In some embodiments, image processing system 302 is incorporated into the CT imaging system 100. For example, image processing system 302 may be provided in the CT imaging system 100 as image processor unit 110 or as computing device 216. In some embodiments, at least a portion of image processing system 302 is disposed at a device (e.g., edge device, server, etc.) communicably coupled to the CT imaging system 100 via wired and/or wireless connections. In some embodiments, at least a portion of image processing system 302 is disposed at a separate device (e.g., a workstation) which can receive projection/image data from the CT imaging system or from a storage device which stores the projection/image data generated by the CT imaging system. Image processing system 302 may be operably/communicatively coupled to a user input device 332 and a display device 334. User input device 332 may be integrated into a CT image system, such as at user input device of the CT imaging system 100. Similarly, display device 334 may be integrated into an CT imaging system, such as at display device of CT imaging system 100.

Image processing system 302 includes a processor 304 configured to execute machine readable instructions stored in non-transitory memory 306. Processor 304 may be single core or multi-core, and the programs executed thereon may be configured for parallel or distributed processing. In some embodiments, processor 304 may optionally include individual components that are distributed throughout two or more devices, which may be remotely located and/or configured for coordinated processing. In some embodiments, one or more aspects of processor 304 may be virtualized and executed by remotely-accessible networked computing devices configured in a cloud computing configuration.

Non-transitory memory 306 may store a contrast phase classifier module 308, an energy transformation module 310, a blending module 312, a segmentation module 314, a regression module 316, a training module 318, and projection/image database 320. The contrast phase classifier module 308 may include a phase classifier configured to identify various contrast phases included in an image of a subject. In some examples, the contrast phase classifier stored in contrast phase classifier module 308 may include one or more machine learning (ML) models configured to identify various contrast phases included in the image of a subject and may include trained and/or untrained ML models, and may further include various data, or metadata pertaining to the one or more ML models stored therein. As an example, the phase classifier may be a deep learning model, such as a neural network. The phase classifier model may be trained with training data that includes 3-plane sets of annotated images. Each 3-plane set of annotated images may include three different scanning planes of a subject obtained at a known contrast phase of a plurality of contrast phases, and the contrast phase may be indicated by the annotations in the images. Different sets of 3-plane sets of annotated images may be obtained at different contrast phases, such that images of each contrast phase are included in the training data.

Energy transformation module 310 may include a plurality of energy transformation models, which may be ML models (e.g., deep learning models), which may be configured to transform images at a first energy level to a second energy level. Each energy transformation model is trained for a specific contrast phase and energy level transformation. For example, a first energy transformation model may transform an image including a first contrast phase and at a first pre-determined kVp/keV to an image at a second pre-determined keV. A second energy transformation model may transform an image including a second contrast phase and at the first pre-determined kVp/keV to an image at the second pre-determined keV. A third energy transformation model may transform an image including a first contrast phase and at the second pre-determined keV to an image at a third pre-determined keV. The energy transformation module 310 may include trained and/or untrained ML models, and may further include various data, or metadata pertaining to the one or more ML models stored therein.

Additionally, non-transitory memory 306 may store the blending module 312 that stores instructions for blending transformed images output from two or more of the energy transformation models based on contrast phase data output from the contrast phase classifier (e.g., when the output from the contrast phase classifier indicates that more than contrast phase is present in an initial image). In particular, the contrast classifier may output a ratio of the identified contrast phase(s) present in an image. The ratio for the contrast phases may be used as a weighting factor for blending the transformed images output from each of the two or more energy transformation models.

Non-transitory memory 306 may also store the segmentation module 314 that stores instructions for identifying different tissue types in images. The segmentation module 314 may include one or more segmentation models which may be ML models (e.g., deep learning models) configured to identify different tissue types included in the images. In some examples, the one or more segmentation models may include a plurality of segmentation models, with each segmentation model configured to output a respective anatomy mask that identifies a single, different tissue type included in the images (e.g., a first segmentation model may be trained to identify a first tissue type, such as fat, a second segmentation model may be trained to identify a second tissue type, such as heart, etc.). Each output anatomy mask may then be summed to form an overall anatomy mask. In other examples, one segmentation model may be trained to identify multiple tissue types included in the image and thus may output an anatomy mask that identifies multiple tissues (e.g., includes different pixel values for the different tissue types).

Regression module 316 may be configured to perform an "anatomy aware" image "transformation" for each pixel in the initial image at the first energy level (or each voxel in an image volume) to form a guide image. The "transformation" maps attenuation (e.g., pixel or voxel intensity value) at each pixel/voxel in the image acquired/generated at a given energy (e.g., the first energy level) to its corresponding attenuation value given a target energy (e.g., the second energy level) using a precomputed function for each tissue type and each contrast phase. In some examples, the regression module 316 may include a plurality of regression models, each regression model specific to a contrast phase. Each regression model may include a plurality of functions that may be applied in order to perform a plurality of mappings, wherein each mapping includes mapping pixel intensity values of pixels corresponding to a specific tissue type from an initial pixel intensity value at a first energy level (and at a first contrast phase) to a final pixel intensity value at a second energy level. Thus, a given regression model may be applied to an initial image by the regression module 316 in order to generate a guide image. The guide image may be a coarsely-transformed image that appears as if generated at the second energy level that may be used to guide transformation (in an organ/tissue specific manner) of the initial image to the second energy level by the deep learning-based energy transformation model, which may result in a more accurate transformation.

Figure 9:
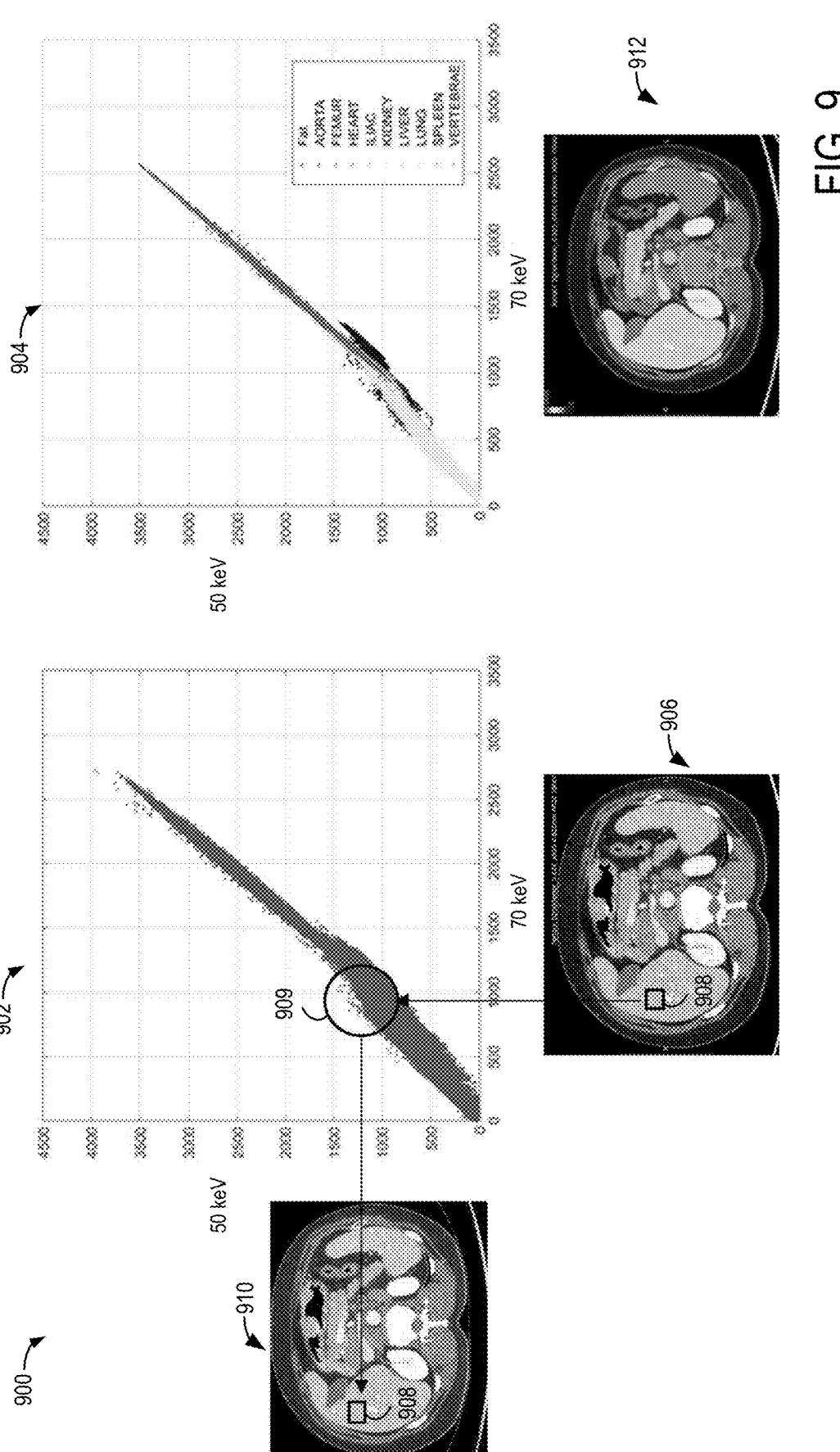
FIG. 9 shows a comparison of regression datasets that may be used to generate regression models wherein regression data is not differentiated by tissue type and regression data is differentiated by tissue type.

Each function may be specific for a tissue type and contrast phase, such that a first function may be applied to map (e.g., transform) initial pixel intensity values of pixels corresponding to a first tissue type in the initial image (at the first energy level and first contrast phase) to final pixel intensity values corresponding to the second energy level, a second function may be applied to map/transform initial pixel intensity values of pixels of a second tissue type to final pixel intensity values, etc. Each function may be generated using regression data for the specific tissue type and contrast phase. For example, and as shown in FIG. 9 and explained in more detail below, pixel intensity values for the first tissue type in images at the second energy level and the first contrast phase may be plotted as a function of pixel intensity values for the first tissue type in images at the first energy level and the first contrast phase, and a line/curve may be fit to the plotted data, where the line/curve may be the first function. A given regression model may include similarly-generated functions for each of a plurality of different tissue types in the same contrast phase.

The regression models may be defined in various ways. In some examples, each regression model may include a plurality of functions, one for each different tissue type, with each function of a particular regression model specific to the same contrast phase and the same energy transformation pair (e.g., each function may be applicable to transform pixel/voxel values from a first energy level to a second energy level). In such examples, once the contrast phase is known, an appropriate regression model is selected and applied to generate the guide image. In other examples, each function may be considered a regression model, such that each regression model includes one function specific to a contrast phase, tissue type, and energy transformation pair. In such examples, once the contrast phase and tissue types in the image are known, the appropriate regression models are selected and applied to generate the guide image. It is to be appreciated that in some examples, a guide image may be generated by first forming two or more sub-images, where each sub-image includes only transformed pixels/voxels of a respective tissue type, and then summing the sub-images to form the guide image.

Thus, in some examples, a first regression model may include functions specific for a first contrast phase (e.g., venous), a second regression model may include functions specific for a second contrast phase (e.g., portal), a third regression model may include functions specific for a third contrast phase (e.g., arterial), and so forth. The first regression model may applicable to perform a first mapping of pixel intensity values of pixels of a first tissue type, which may be bone tissue, and a second mapping of pixel intensity values of pixels of a second tissue type. The first mapping may map pixel intensity values of pixels identified as the first tissue type from a first set of initial pixel intensity values at the first energy level to a first set of final pixel intensity values at the second energy level. The first mapping may be performed with a first function generated from regression data for the first tissue type. The second mapping may map pixel intensity values of pixels identified as the second tissue type from a second set of initial pixel intensity values at the first energy level to a second set of final pixel intensity values at the second energy level. The second mapping may be performed with a second function generated from regression data for the second tissue type. The regression module 316 may include various data, or metadata pertaining to the one or more regression models stored therein.

Additionally, non-transitory memory 306 may store the blending module 312 that stores instructions for blending transformed images output from two or more of the energy transformation models based on contrast phase data output from the contrast phase classifier (e.g., when the output from the contrast phase classifier indicates that more than contrast phase is present in an initial image). In particular, the contrast classifier may output a ratio of the identified contrast phase(s) present in an image. The ratio for the contrast phases may be used as a weighting factor for blending the transformed images output from each of the two or more energy transformation models.

Non-transitory memory 306 may further store a training module 318, which may comprise instructions for training one or more of the ML models stored in contrast phase classifier module 308 and/or energy transformation module 310. Training module 318 may include instructions that, when executed by processor 304, cause image processing system 302 to conduct one or more of the steps of a training method for training the contrast phase classifier to identify contrast phases present in an image and a training method for training a plurality of energy transformation model to generate a transformed image at a second energy level from an initial image at a first energy level. In some examples, each energy transformation model may be further trained with an inverse transformed image generated by a respective inverse energy transformation model, as explained in more detail below.

In some embodiments, training module 318 may include instructions for implementing one or more gradient descent algorithms, applying one or more loss functions, and/or training routines, for use in adjusting parameters of one or more ML models of contrast phase classifier module 308 and/or energy transformation module 310. Training module 318 may include training datasets for the one or more ML models of contrast phase classifier module 308 and/or energy transformation module 310.

Non-transitory memory 306 also stores projection/image database 320. The projection/image database 320 may include, for example, projection data acquired via an CT imaging system and images reconstructed from the projection data. For example, projection/image database 320 may store projection data acquired via CT imaging system 100, and/or received from other communicatively coupled CT imaging systems or image databases. In some examples, projection/image database 320 may store images generated by energy transformation module 310 or blending module 312. Projection/image database 320 may further include one or more training datasets for training the one or more ML models of contrast phase classifier module 308 and/or energy transformation module 310.

In some embodiments, non-transitory memory 306 may include components disposed at two or more devices, which may be remotely located and/or configured for coordinated processing. In some embodiments, one or more aspects of non-transitory memory 306 may include remotely-accessible networked storage devices configured in a cloud computing configuration.

User input device 332 may comprise one or more of a touchscreen, a keyboard, a mouse, a trackpad, a motion sensing camera, or other device configured to enable a user to interact with and manipulate data within image processing system 302. In one example, user input device 332 may enable a user to make a selection of projection data to use in training a machine learning model, or for further processing using a trained machine learning model (e.g., the phase classifier model and energy transformation model disclosed herein).

Display device 334 may include one or more display devices utilizing virtually any type of technology. In some embodiments, display device 334 may comprise a computer monitor, and may display CT images, including images generated by energy transformation module 310 and blending module 312. Display device 334 may be combined with processor 304, non-transitory memory 306, and/or user input device 332 in a shared enclosure, or may be peripheral display devices and may comprise a monitor, touchscreen, projector, or other display device known in the art, which may enable a user to view CT images produced by an CT imaging system, and/or interact with various data stored in non-transitory memory 306.

It should be understood that image processing system 302 shown in FIG. 3 is for illustration, not for limitation. Another appropriate image processing system may include more, fewer, or different components.

Figure 4:
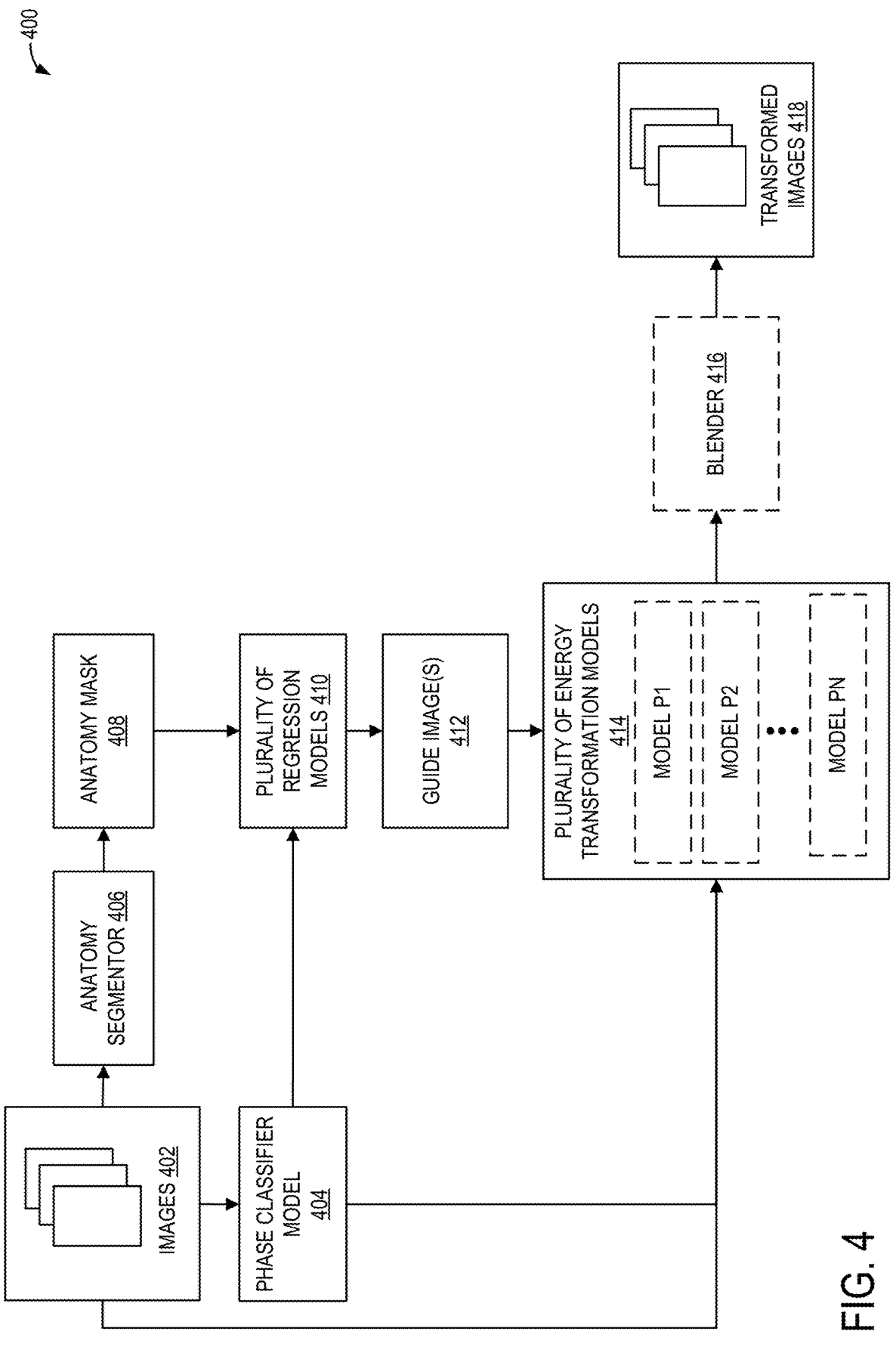
FIG. 4 schematically illustrates an example process for generating transformed images from initial images, where the transformed images are at a different energy level than the initial images, with a deep learning (DL)-based framework.

Turning to FIG. 4, a process 400 for generating one or more final transformed images 418 from one or more respective images 402 is illustrated, which may be performed by the image processing system 302 of FIG. 3. The process 400 may include obtaining images 402. Images 402 may be generated from projection data collected during a single-energy CT scan protocol, and thus each image of images 402 may be single-energy images reconstructed from projection data obtained while operating an x-ray source of the CT imaging system at a first energy level, which may be a single peak energy level, such as at 120 kVp. The projection data may be obtained when performing the single-energy CT scan protocol on a region of interest (ROI) of a subject. While images 402 are described herein as being obtained with a single-energy CT imaging system, it is to be appreciated that one or more of the images may be obtained with other types of CT imaging systems (e.g., dual-energy), though operated in a single-energy mode (such that the projection data used to reconstruct the images was obtained only at a single peak energy level).

The process 400 may include entering an image (e.g., an initial image) from images 402 into a contrast phase classifier model 404 (which may be a non-limiting example of the contrast phase classifier described above with respect to FIG. 3) to identify one or more contrast phases present in the initial image. In some embodiments, the contrast phase classifier model 404 may be a deep learning (DL) model. In other embodiments, the contrast phases may be identified with alternative methods, such as a bolus timing technique. In this way, the contrast phase classifier model 404 may output the identified contrast phase(s) and a ratio of each identified contrast phase included in the initial image.

The process 400 may include entering the image (e.g., the initial image) from images 402 into an anatomy segmentor 406 (which may be a non-limiting example of the segmentation module described above with respect to FIG. 3) to perform anatomical segmentation on the image. In some embodiments, the anatomy segmentor 406 may include one or more a machine learning (ML) models configured to perform anatomical segmentations on images 402. In this way, the anatomy segmentor 406 may generate an anatomy mask 408 that identifies each tissue type in the image.

The process 400 may include selecting a regression model from among a plurality of regression models 410, wherein each regression model corresponds to a respective contrast phase. The plurality of regression models 410 may be included in the regression module of FIG. 3. One or more regression models are selected from the plurality of regression models 410 based on the identified contrast phase(s) in an initial image. In an example, if the initial image is identified as including only one contrast phase, one regression model corresponding to the identified contrast phase may be selected. If the initial image is identified as including two contrast phases (e.g., transitioning from a first contrast phase to a second contrast phase), two regression models may be selected, each corresponding to a respective contrast phase.

For example, the initial image may be determined to include only one contrast phase (e.g., a first contrast phase, such as venous) and a first regression model corresponding to the identified first contrast phase may be selected. The first regression model may include a plurality of functions, where each function is specific for a given tissue type. The plurality of functions may be applied to map/transform the initial pixel intensity values of the initial image to final pixel intensity values that correspond to the second energy level to generate a guide image 412. It is to be appreciated that each function may be specific to a respective tissue type, and thus a first function that is specific to fat, for example, may be applied only to pixels of the initial image identified (by the anatomy mask 408) as being fat tissue, a second function that is specific to heart tissue may be applied only to pixels of the initial image identified as being heart issue, and so forth.

In another example, the initial image may be determined to include two contrast phases (e.g., the first contrast phase and a second contrast phase) and the first regression model and a second regression model corresponding to the second contrast phase may be selected. The first regression model may be applied to generate a first guide image in a first contrast phase as described above. The second regression model may be applied to generate a second guide image in a second contrast phase, by applying a plurality of functions (specific to the second contrast phase) to perform a second tissue-specific mapping of pixel intensity values of pixels from a second set of initial pixel intensity value at the first energy level to a second set of final pixel intensity values at the second energy level.

Additionally, the process 400 may include selecting an energy transformation model from among a plurality of energy transformation models 414, wherein each energy transformation model corresponds to a respective contrast phase and energy transformation pair. The energy transformation pair refers to the initial energy level of the image to be transformed (e.g., the first energy level) and a final energy level of the transformed image (e.g., the second energy level). The plurality of energy transformation models 414 may be trained on pairs of images obtained with a dual-energy CT scan protocol wherein one image in the pair of images is at a first energy level and the other image is at a second energy level.

One or more energy transformation models are selected from a plurality of energy transformation models 414 based on the identified contrast phase(s) in the initial image. For example, if the initial image is identified as including only one contrast phase, one energy transformation model may be selected, corresponding to the identified contrast phase. If the initial image is identified as including two contrast phases (e.g., transitioning from a first contrast phase to a second contrast phase), two energy transformation models may be selected, each corresponding to a respective contrast phase and trained for the desired energy transformation (e.g., the energy transformation pair described above). Thus, each energy transformation model in the plurality of energy transformation models 414 may be trained to transform images from a first predetermined energy level (e.g., 120 kVp) to a second predetermined energy level (e.g., 50 keV) using a guide image. As one example, a first model P1 may be configured to transform images with no contrast, a second model P2 may be configured to transform images in the venous phase, on up to a nth model PN that may be configured to transform images in the delayed phase (additional models may be included in the plurality of energy transformation models 414 to transform images in the portal phase and arterial phase, for example, which are not shown in FIG. 4 for brevity).

The initial image and a respective guide image may be entered as input to each selected energy transformation model, and each selected energy transformation model may output a respective transformed image. When the initial image only includes one contrast phase, the initial image and guide image may be entered as input to the selected energy transformation model and the transformed image output by the selected energy transformation model may be a final transformed image that is displayed to a user on a display device, for example. For images that include two contrast phases (e.g., a first contrast phase and a second contrast phase), two energy transformation models may be selected and two guide images may be generated as explained above. The initial image and a first guide image may be entered as input to a first energy transformation model, and the initial image and a second guide image may be entered as input to a second energy transformation model. The transformed images output by the two energy transformation models may be input into a blender 416 to generate the final transformed image. The final transformed image may be generated from the two or more transformed images by applying a weighting factor to each of the transformed images output from the energy transformation models and then summing the weighted images. The weighting factor may be based on the ratio of a contrast phase relative to other identified contrast phases included in the initial image.

Thus, the process described above may be repeated for each image in images 402 to produce the final transformed images 418. The final transformed images are each at the second energy level. In some embodiments, the first energy level is higher than the second energy level. As such, the final transformed images 418 may have increased contrast visibility compared to images 402. In this way, visualization of the ROI of the subject may be increased. In some embodiments, the first energy level is lower than the second energy level. For example, it may be beneficial to transform an image in images 402 to a higher energy level during non-contrast or low-contrast image generation where an additional non-contrast scan is not performed (e.g., to produce non-contrast or low-contrast images from a contrast scan) or to facilitate a downstream task which utilizes low contrast and low noise images.

Figure 5:
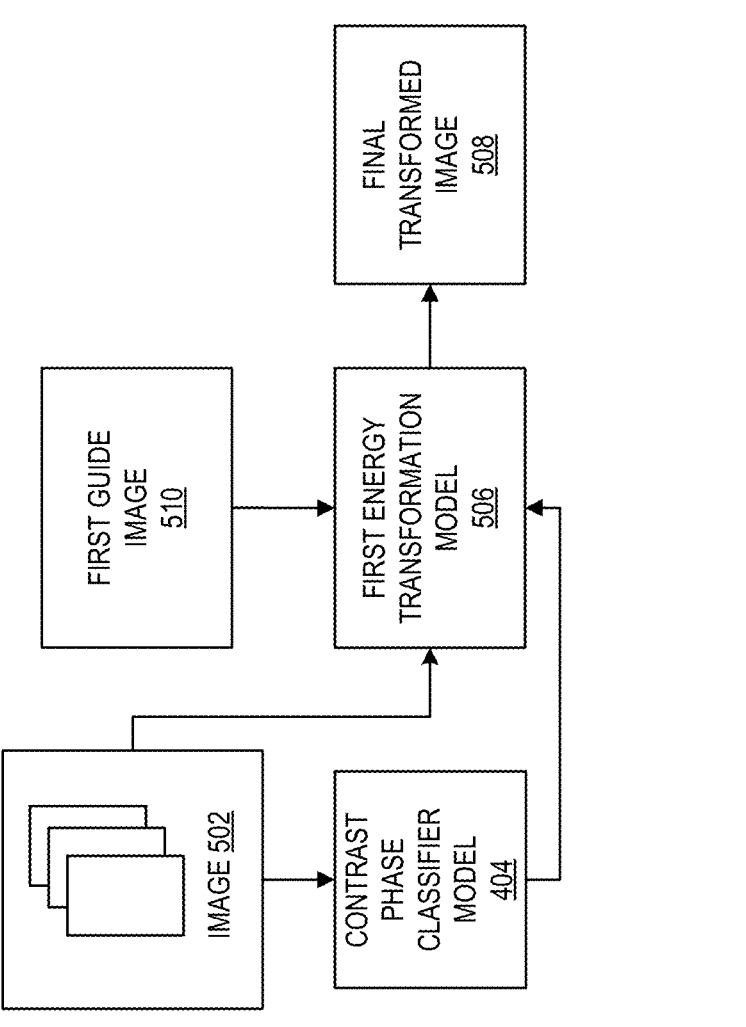
FIG. 5 schematically illustrates an example process for serially generating a transformed image from an initial image at a different energy level.

FIG. 5 is a process 500 for transformations of an image 502 from a first energy level to a second energy level. The process 500 may be an example of the process 400 described with respect to FIG. 4. The image 502 may be an image included in images 402 described above with regards to FIG. 4, and thus be obtained at the first energy level. As described herein, each energy transformation model may be trained to perform an energy transformation of a pre-determined size of energy transformation (e.g., a pre-determined change in energy level) between an initial energy level and a final energy level. Transformed images may exhibit poor image quality and ROI visualization if the size of the energy transformation is larger than a threshold (e.g., more than 20 keV), which may render the image non-diagnostic and/or may result in a missed diagnosis or a misdiagnosis, especially in oncological applications. Even energy transformations wherein the size of the energy transformation is less than the threshold may generate transformed images that may still be non-diagnostic and/or may result in a missed diagnosis or a misdiagnosis. Thus, when a transformation of an image at an initial energy level (e.g., image 502) to a different energy level is desired, a guide image may be used to help facilitate energy transformations performed on the image 502 to generate a transformed image at a second energy level from the image 502 at the first energy level, which may ensure image quality is satisfactory.

As such, the process 500 includes entering the image 502 at the first energy level to a contrast phase classifier model, which may be the same as the contrast phase classifier model 404 of FIG. 4. A first energy transformation model 506 may be selected based on the contrast phase of image 502 as determined by the contrast phase classifier model 404. The first energy transformation model 506 may be one of the plurality of energy transformation models 414 of FIG. 4. Accordingly, the first energy transformation model 506 may be trained to transform an image, such as image 502, from a first energy level to a second energy level wherein the first energy level is different than the second energy level. The first energy transformation model 506 may use a first guide image 510 to guide the transformation of the image 502, as explained above with respect to FIG. 4.

For example, the first energy level may be 120 kVp (equivalent to 70 keV) and the second energy level may be 50 keV. The process 500 may include entering image 502 and the first guide image 510 as input to the first energy transformation model 506 to generate a final transformed image 508 at the second energy level. The first guide image 510 may be generated by selecting a regression model from among a plurality of regression models based on the output from the contrast phase classifier model 404 (e.g., based on the identified contrast phase) and applying one or more tissue-specific functions included in the selected regression model to the image 502 based on the tissue types identified in the image 502, as described above with respect to FIG. 4.

It is to be appreciated that in examples where an initial image includes more than one contrast phase, a modified version of process 500 may be performed. The modified version may include generating two or more first guide images (from two or more regression models, each selected based on the identified contrast phases) and selecting two or more first energy transformation models, wherein each first energy transformation model is trained to transform images from the first energy level to the second energy level. Each first energy transformation model is selected based on the contrast phases identified in the initial images. The first energy transformation models each output a respective first transformed image (based on the initial image and a respective first guide image), and the multiple first transformed images are blended into a final transformed image.

Figure 6:
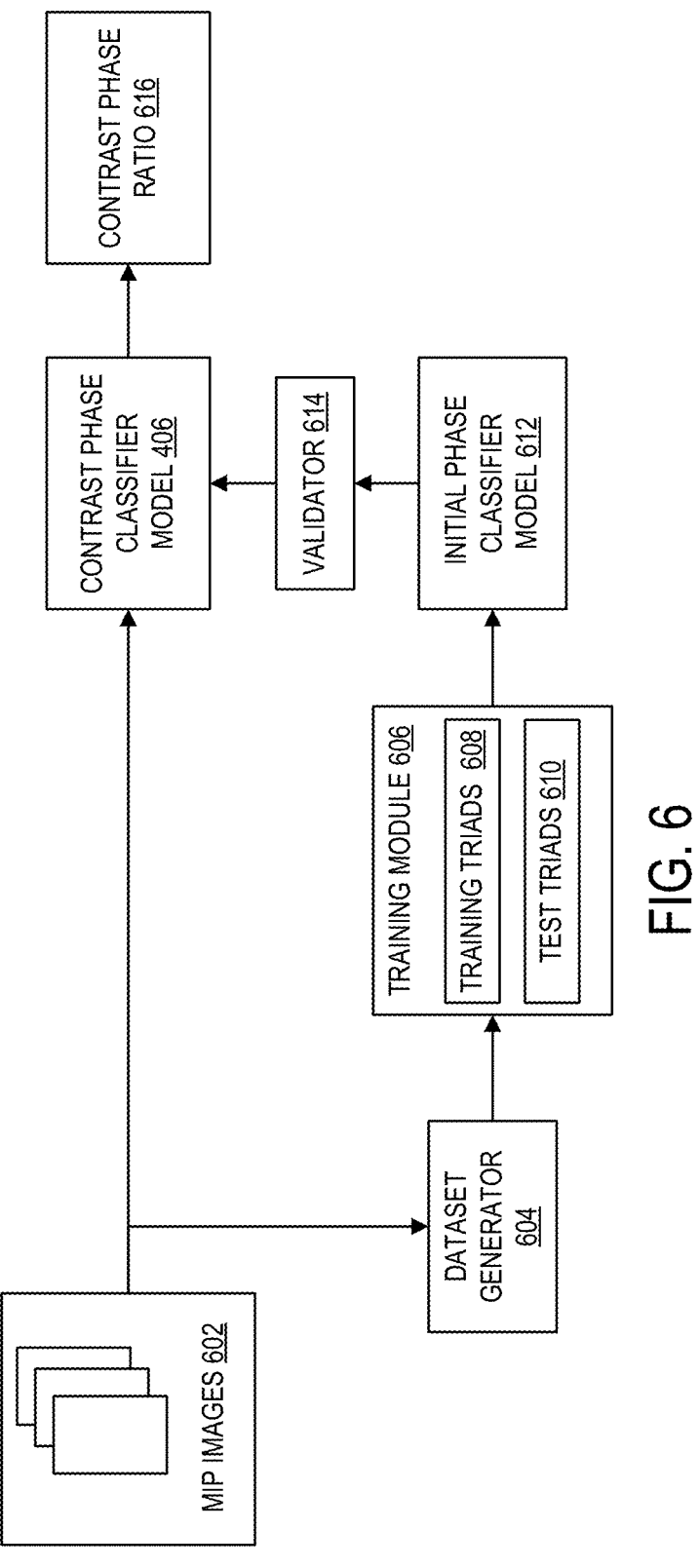
FIG. 6 schematically illustrates an example process for training a contrast phase classifier.

Turning to FIG. 6, a process 600 for training a contrast phase classifier model 404 is illustrated. The contrast phase classifier model 404 may be trained to identify contrast phases included in images acquired with an CT imaging system, such as CT imaging system 100 of FIG. 1, in accordance with one or more operations described in greater detail below in reference to FIG. 10. The process 600 may be implemented by one or more computing systems, such as image processing system 302 of FIG. 3, to train the contrast phase classifier model 404 to identify contrast phases included in images acquired with the CT imaging system based on sets of 3-plane annotated maximum intensity projections (MIP) images. Once trained, the contrast phase classifier model 404 may be used to identify contrast phases included in images acquired with a CT imaging system (e.g., CT imaging system 100 of FIG. 1), in accordance with one or more operations described in greater detail below in reference to FIGS. 8 and 9.

The process 600 includes obtaining MIP images 602 of one or more subjects. For example, a 3D volume of projection data of an ROI (e.g., brain, heart, liver) may be obtained of each of the one or more subjects during a contrast scan where contrast agent is administered to each subject and projection data is obtained before, during, and/or after contrast uptake and washout, and a set of MIP images (e.g., in three different scanning planes, such as axial, coronal, and sagittal) may be generated from each volume. The MIP images 602 may be annotated with one or more contrast phases. A respective annotation of each annotated MIP image may indicate a contrast phase included in each annotated MIP image. Depending on a timing of when the respective MIP image is acquired relative to injection of a contrast agent, the respective MIP image may include more than one contrast phase. Accordingly, the respective MIP image may include one or more annotations indicating one or more of no contrast, a venous phase, a portal phase, an arterial phase, and a delayed phase.

The process 600 includes generating a plurality of training triads of data using a dataset generator 604. The plurality of training triads of data may be stored in a training module 606. The training module 606 may be the same as or similar to the training module 318 of image processing system 300 of FIG. 3. The plurality of training triads of data may be divided into training triads 608 and test triads 610. Each training triad of training triads 608 and test triads 610 may include a 3-plane set of annotated images from MIP images 602, including a first annotated MIP image in a first scanning plane, a second annotated MIP image in a second scanning plane, and a third annotated MIP image in a third scanning plane, each generated from the same volume of projection data.

Once each triad is generated, each triad may be assigned to either the training triads 608 or the test triads 610. In an embodiment, the triad may be assigned to either the training triads 608 or the test triads 610 randomly in a pre-established proportion (e.g., 90%/10% training/test, or 85%/15% training/test). It should be appreciated that the examples provided herein are for illustrative purposes, and triads may be assigned to the training triads 608 dataset or the test triads 610 dataset via a different procedure and/or in a different proportion without departing from the scope of this disclosure.

A number of training triads 608 and test triads 610 may be selected to ensure that sufficient training data is available to prevent overfitting, whereby an initial contrast phase classifier model 612 learns to map features specific to samples of the training set that are not present in the test set. The process 600 includes training the initial contrast phase classifier model 612 on the training triads 608. The process 600 may include a validator 614 that validates the performance of the initial contrast phase classifier model 612 (as the initial model is trained) against the test triads 610. The validator 614 may take as input a trained or partially trained model (e.g., the initial contrast phase classifier model 612, but after training and update of the model has occurred) and a dataset of test triads 610, and may output an assessment of the performance of the trained or partially trained contrast phase classifier model on the dataset of test triads 610.

Thus, the initial contrast phase classifier model is trained on a training triad wherein the training triad includes the first annotated MIP image (in the first scanning plane), the second annotated MIP image (in the second scanning plane), and the third annotated MIP image (in the third scanning plane), each of the same subject and the same contrast phase(s). Additional training triads may be used to train the initial contrast phase classifier model, each including three images in the three different scanning planes, of the same subject and same contrast phase(s), though it is to be appreciated that different triads may be of different subjects and/or contrast phases. A respective annotation of each annotated MIP image indicates a contrast phase(s) included in each annotated image. In this way, each annotated MIP training image may be annotated with all the contrast phases included in the respective annotated MIP image. The respective annotation may be considered as the ground truth contrast phase(s). The ground truth contrast phase(s) may be compared with identified contrast phase(s) output from the initial contrast phase classifier model to calculate a loss function that is used to adjust model parameters of the initial contrast phase classifier model. In some examples, the contrast phase classifier model may be trained to output a relative probability, for each possible contrast phase (e.g., no contrast, venous, portal, arterial, and delayed), that an input 3-plane set of MIP images includes the contrast phases, and the ratio of contrast phases described herein may be the relative probabilities.

Once the validator 614 determines that the contrast phase classifier model is sufficiently trained, the contrast phase classifier model may be stored in the contrast phase classifier module 308 of FIG. 3. The contrast phase classifier model 404, when deployed, may identify contrast phases in images acquired with a CT imaging system. Newly-acquired images may be entered as input to the contrast phase classifier model 404 to output a contrast phase ratio 618 for identified contrast phases. The contrast phase ratio 618 may be used to select energy transformation model(s) and also used as a weighting factor for blending multiple transformed images according to the embodiments described herein.

Figure 7:
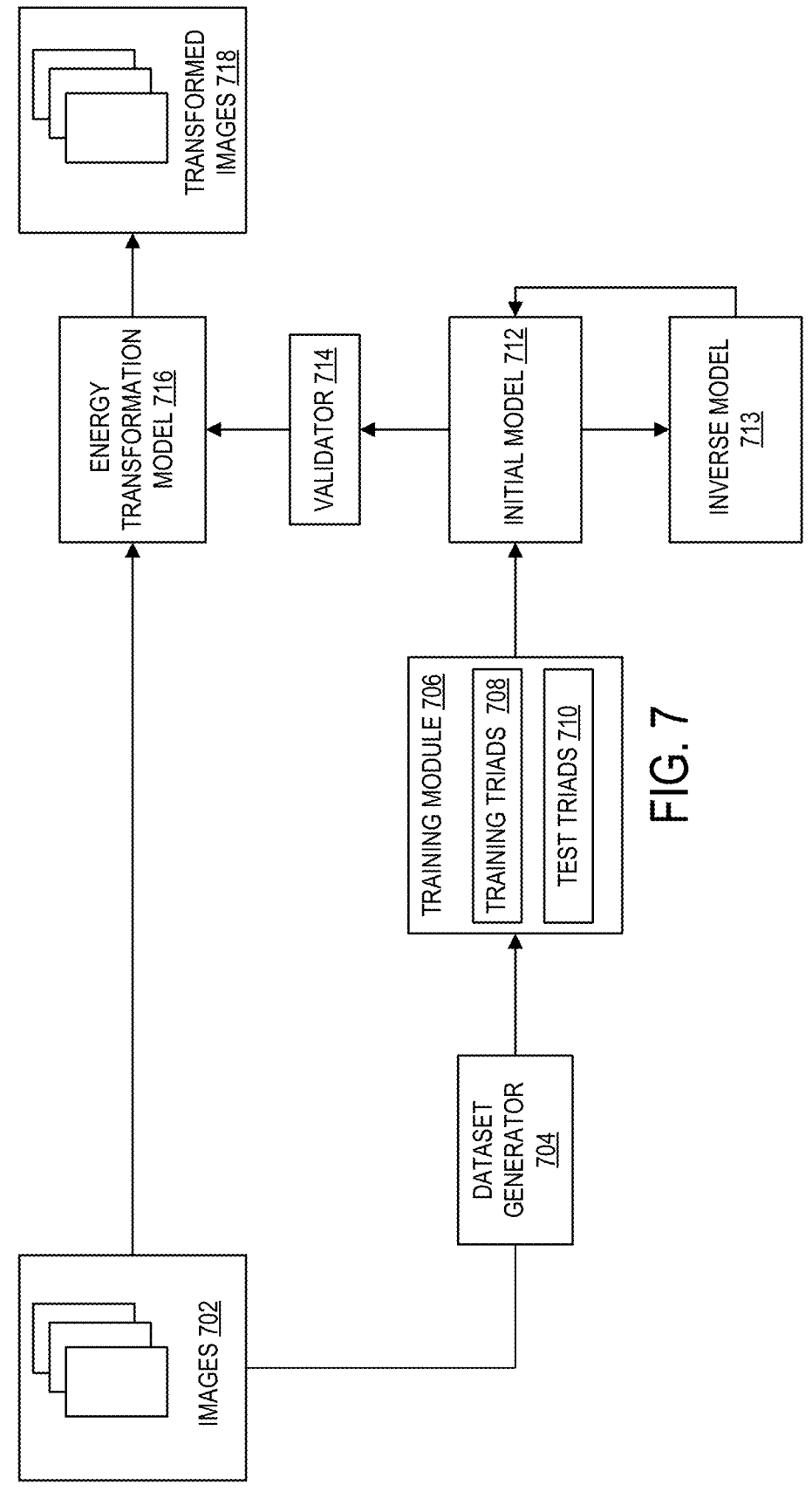
FIG. 7 schematically illustrates an example process for training an energy transformation model.

A process 700 for training an energy transformation model 716 (e.g., of the plurality of energy transformation models 414) is illustrated in FIG. 7. The energy transformation model 716 may be trained to transform an image at a first energy level (acquired with an CT imaging system, such as imaging system 100 of FIG. 1) to an image at a second energy level, in accordance with one or more operations described in greater detail below in reference to FIG. 11. The process 700 may be implemented by one or more computing systems, such as image processing system 302 of FIG. 3. Once trained, the energy transformation model 716 may be used to transform images acquired with a CT imaging system (e.g., CT imaging system 100 of FIG. 1) using an image at a first energy level, in accordance with one or more operations described in greater detail below in reference to FIG. 8.

The process 700 includes obtaining images 702 of one or more subjects. Images 702 may be obtained according to a dual-energy CT scan protocol (e.g., with a dual-energy CT imaging system) wherein for each acquisition, projection data is acquired at two different peak energy levels. From each acquisition of projection data, two images (e.g., mono-chromatic images) are generated, each at a different energy level (e.g., the first energy level and the second energy level). Each of the two images includes a region of interest (ROI) of a subject in a single contrast phase. In one example, the ROI may be a brain, a heart, or other anatomical parts and features of the subject. Images 702 may include a single contrast phase, the contrast phase being one of no contrast, a venous phase, a portal phase, an arterial phase, or a delayed phase. In some examples, images 702 may include at least some images with multiple (e.g., two) contrast phases.

The process 700 includes generating a plurality of training triads of data using a dataset generator 704. The plurality of training triads of data may be stored in a training module 706. The training module 706 may be the same as or similar to the training module 318 of image processing system 302 of FIG. 3. The plurality of training triads of data may be divided into training triads 708 and test triads 710. Each of training triads 708 and test triads 710 may include a first image at a first energy level, a second image at a second energy level, wherein the first energy level is different than the second energy level, and a guide image. The guide image may be generated from the first image by applying an appropriate regression model to transform the image information at the first energy level (e.g., the pixel intensity values) to the second energy level, in a tissue-specific manner, as explained above with respect to FIGS. 3-5. As a non-limiting example, the first energy level may be 70 keV and the second energy level may be 50 keV.

Once each triad is generated, each triad may be assigned to either the training triads 708 or the test triads 710, similar to the process 600 described above. It should be appreciated that the examples provided herein are for illustrative purposes, and triads may be assigned to the training triads 708 dataset or the test triads 710 dataset via a different procedure and/or in a different proportion without departing from the scope of this disclosure.

A number of training triads 708 and test triads 710 may be selected to ensure that sufficient training data is available to prevent overfitting, whereby an initial model 712 learns to map features specific to samples of the training set that are not present in the test set. The process 700 includes training the initial model 712 on the training triads 708. The process 700 may include a validator 714 that validates the performance of the initial model 712 (as the initial model is trained) against the test triads 710. The validator 714 may take as input a trained or partially trained model (e.g., the initial model 712, but after training and updating of the model has occurred) and a dataset of test triads 710, and may output an assessment of the performance of the trained or partially trained energy transformation model on the dataset of test triads 710.

The initial model 712 may be an initial energy transformation model that is trained on a training triad wherein the training triad includes a guide image, a first image at the first energy level, and the ground truth image (e.g., the second image at the second energy level). The first energy level may be an initial energy level and the second energy level may be a desired energy level. The ground truth image may be compared with a transformed image output from the initial model to calculate a first loss function that is used to adjust model parameters of the initial model. Further, in some examples, the transformed image output from the initial model may be re-transformed back to the first energy level using an initial inverse model 713. In other words, the initial inverse model 713 may output an inverse transformed image using the transformed image as input. The first image (e.g., at the first energy level) may be compared with the inverse transformed image output from the initial inverse model 713 to calculate a second loss function that is used to adjust model parameters of both the initial model 712 and the initial inverse model 713.

Once the validator 714 determines that the energy transformation model is sufficiently trained, the energy transformation model 716 may be stored in the energy transformation module 310 of FIG. 3. The energy transformation model 716, when deployed, may transform images at one energy level (e.g., the first energy level) to transformed images at another energy level (e.g., the second energy level). Newly acquired-images (e.g., from images 702) obtained at a single peak energy level (e.g., the first energy level), determined to be in the same contrast phase as the images used to train the energy transformation model 716, may be entered as input to the energy transformation model 716 to generate transformed images 718. The transformed images 718 may be displayed via a display device or saved to memory as described above with respect to FIG. 3 or may undergo additional image processing, such as blending according to the embodiments described herein.

It is to be appreciated that the process 700 may be repeated to train a plurality of additional energy transformation models. For example, a first subset of energy transformation models may be trained to transform images from the first energy level to the second energy level, with each energy transformation model of the first subset of energy transformation models trained with images that include a respective different contrast phase, so that each energy transformation model of the first subset is specific to one contrast phase (e.g., a first energy transformation model of the first subset may be specific to arterial phase, a second energy transformation model of the first subset may be specific to venous phase, etc.). A second subset of energy transformation models may be trained to transform images from the second energy level to a third energy level (e.g., 30 keV), with each energy transformation model of the second subset of energy transformation models trained with images that include a respective different contrast phase, so that each energy transformation model of the second subset is specific to one contrast phase (e.g., a first energy transformation model of the second subset may be specific to arterial phase, a second energy transformation model of the second subset may be specific to venous phase, etc.).

Figure 8:
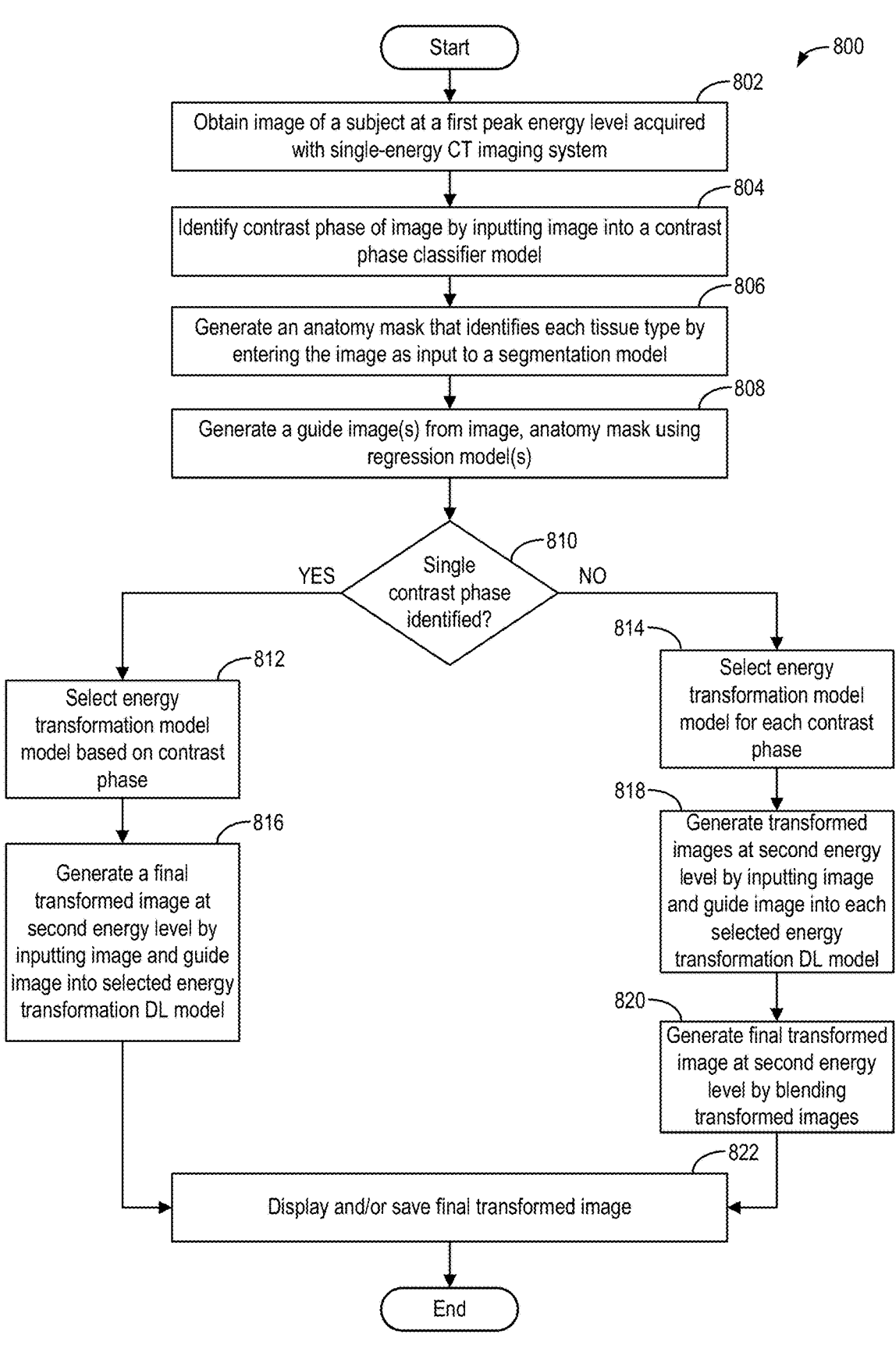
FIG. 8 is a flow chart illustrating a method for transforming images from a first energy level to a second energy level using a contrast phase classifier and energy transformation model, according to embodiments of the present disclosure.

FIG. 8 is a flowchart illustrating a method 800 for generating a final transformed image at a second energy level from an image at a first energy level, according to an embodiment of the disclosure. Method 800 may be carried out according to instructions stored in non-transitory memory and executed by one or more processors of a computing device, such as computing device 216 of FIG. 2 and/or the image processing system 302 of FIG. 3.

At 802, the method 800 includes obtaining an image at a first peak energy level acquired with a single-energy imaging system and/or according to a single-energy scan protocol. The image may be generated from projection data of a region of interest (ROI) of a subject, wherein the projection data is acquired at a single peak x-ray tube energy level. The ROI may include an anatomical part or anatomical features, such as a brain of the subject, a chest of the subject, and the like. In some embodiments, the projection data may be obtained with the CT imaging system of FIGS. 1 and 2. The image at the first peak energy level may be a suitable three-dimensional (3D) rendering of a volume of projection data, such as a maximum intensity projection (MIP) image, a minimum intensity projection image, an image generated with a custom-defined projection, and the like. In other embodiments, the image at the first peak energy level may be a two-dimensional (2D) slice image generated from the projection data.

At 804, the method 800 includes identifying a contrast phase of the image by inputting the image into a contrast phase classifier. The contrast phase classifier may be the contrast phase classifier model described with respect to FIGS. 4-6, or another suitable classifier configured to identify the contrast phase(s) of the image. Identifying the contrast phase of the image with the contrast phase classifier may include identifying a single contrast phase or more than one contrast phase in the image. In some examples, the contrast phase classifier may output a ratio of contrast phases. In some examples, as explained above, the ratio may include a respective probability that the image includes each respective contrast phase. In other examples, the ratio of the contrast phases may refer to, for each contrast phase, a percentage of pixels within the image that are in that contrast phase. In still further examples, the contrast phase classifier may utilize a contrast enhancement curve generated during scanning of the subject, and may identify the contrast phase(s) based on a timing of when the projection data used to generate the image was acquired relative to the contrast enhancement curve. Potential contrast phases include no contrast, a venous phase, a portal phase, an arterial phase, and a delayed phase.

In some examples, the contrast phase classifier may identify that the image includes a single contrast phase, which may be a first contrast phase. For example, the contrast phase classifier may output a value for the first contrast phase that is above a first threshold value, such as above 0.8, above 0.9, or equal to or approximately equal to 1. When the value of the first contrast phase is above the first threshold value, nearly all or all of the relevant pixels in the image may be determined to in the first contrast phase. Relevant pixels in the image may refer to tissue pixels that may uptake a contrast agent. In an example, the first contrast phase may be the venous phase. Therefore, the image may include only the venous phase based on the value of the ratio for the first contrast phase.

In other examples, the contrast phase classifier may identify that more than one contrast phase is included in the image. For example, the contrast phase classifier may identify that the image includes the first contrast phase and a second contrast phase, the first contrast phase and the second contrast phase being different. The image may be identified as including both the first and second contrast phases based on none of the values output by the contrast phase classifier being above the first threshold value and the values corresponding to the first and second contrast phases being above a second threshold value (e.g., above 0.1). For example, a first value for the first contrast phase may be equal to 0.65 and a second value for the second contrast phase may be equal to 0.35, indicating that approximately 65% of the relevant pixels in the image are in the first phase and 35% of the relevant pixels are in the second phase. As an example, the first contrast phase may be the venous phase and the second contrast phase may be the portal phase. Thus, the image may include tissue pixels in the venous phase and tissue pixels in the portal phase.

In some examples, as explained previously, the contrast phase classifier may output a value for each potential contrast phase that may be included in the images. For example, the contrast phase classifier may output the first value for the first contrast phase, the second value for the second contrast phase, a third value for a third contrast phase, a fourth value for a fourth contrast phase, and a fifth value for a fifth contrast phase. The values may range from value of 0 to a value of 1. A value of 0 may indicate that the respective contrast phase is not included in the image. A value of 1 may indicate that image only includes the respective contrast phase, and no other contrast phases are included in the image. A value between 0 and 1 (and specifically below the first threshold and above the second threshold described above) indicates that more than one contrast phase may be included in the image.

At 806, the method 800 includes generating an anatomy mask by entering the image as input to a segmentation model. In some embodiments, the segmentation model may be trained to output the anatomy mask that identifies each tissue type in the image. Generating the anatomy mask with the segmentation model may include identifying sets of pixels corresponding to different tissue types, and each set of pixels may correspond to one tissue type. For example, a first set of pixels may correspond to a first tissue type, which may be heart tissue and a second set of pixels may correspond to a second tissue type, which may be lung tissue. The anatomy mask may be generated based on the sets of pixels corresponding to the different tissue types. The anatomy mask may include a pixel value for each pixel of the image that indicates the tissue type in the image, e.g., a value of 0 indicates no identified tissue, a value of 1 indicates heart tissue, a value of 2 indicates lung tissue, and so forth. However, other mechanisms for identifying the tissue types in the anatomy mask are possible without departing from the scope of this disclosure. Further, in some examples, the tissue types in the image may be identified via other mechanisms besides a segmentation model, such as manually by a user.

At 808, the method 800 includes generating a guide image from the image and the anatomy mask using a regression model(s). The regression model may be selected from among a plurality of regression models based on the identified contrast phase, wherein each regression model corresponds to a particular contrast phase, such as no contrast, the venous phase, the portal phase, the arterial phase, and the delayed phase. Each regression model may include a plurality of functions for various tissue types. For example, a first function may be generated from regression data for the first tissue type in the contrast phase, such as heart tissue, and a second function may be generated from regression data for the second tissue type in the same contrast phase, such as lung tissue. In this way, the various functions of the regression model may be applied to transform the image at the first energy level to the guide image, in a tissue-specific manner.

In particular, the regression model may be applied to perform mappings of pixel intensity values at the first energy level to pixel intensity values at the second energy level. For example, the regression model may be applied to perform a first mapping that may comprise mapping a first set of initial pixel intensity values for pixels of the first tissue type to a first set of final pixel intensity values at a second energy level using the first function and a second mapping may comprise mapping a second set of initial pixel intensity values for pixels of the second tissue type to a second set of final pixel intensity values at the second energy level using the second function. Overall, the regression model is configured to perform tissue-type specific mapping of pixel intensity values from the first image to corresponding pixel intensity values corresponding to the second energy level, wherein the guide image comprises the corresponding pixel intensity values. In this way, a guide image may be generated from the anatomy mask and the image using regression data pertaining to the various tissue types identified in the anatomy mask.

In examples where two contrast phases (or more) are present in the image, a guide image may be generated for each contrast phase in a manner similar to the above process, wherein a respective regression model is selected for each contrast phase and used to generate a first guide image for the first contrast phase and a second guide image for the second contrast phase.

At 810, the method 800 includes determining whether a single contrast phase is identified by the contrast phase classifier. The determination of whether the image includes a single contrast phase or more than one contrast phase may be made as explained above, e.g., based on the values output by the contrast phase classifier. The image may be identified as including only one contrast phase when the value for that contrast phase is above the first threshold value, or may be identified as including more than one contrast phase when no values output by the contrast phase classifier are above the first threshold value. In one example, the contrast phase classifier may output a value of 0 for no-contrast, a value of 0.5 for the delayed phase, a value of 0.4 for the venous phase, a value of 0.05 for the portal phase, and a value of 0.05 for the arterial phase. Since the contrast phase classifier outputs more than one value that is above the second threshold but no values that are above the first threshold, the image is identified as including more than one contrast phase.

In response to determining that only one contrast phase is identified in the image, the method 800 includes selecting an energy transformation model based on the contrast phase at 812. As described herein, to transform the images, the contrast value for each contrast phase is mapped from the first (e.g., higher) energy level to the second (e.g., lower) energy level. However, mapping a particular contrast phase from the first energy level to the second energy level may be different depending on the particular contrast phase. As such, energy transformation models are trained for one specific contrast phase according to the method described in FIG. 11. In this way, the energy transformation model may be selected based on the identified contrast phase output from the contrast phase classifier. Further, the energy transformation model is also selected based on a desired energy level transformation (e.g., change in energy level from the initial energy level to the final energy level).

For a given energy level transformation, the selected energy transformation model may be selected from among a first energy transformation model for a first contrast phase, a second energy transformation model for a second contrast phase, a third energy transformation model for a third contrast phase, a fourth energy transformation model for a fourth contrast phase, and a fifth energy transformation model for a fifth contrast phase, wherein the first contrast phase, the second contrast phase, the third contrast phase, the fourth contrast phase, and the fifth contrast phase correspond to different contrast phases.

Each of the first contrast phase, the second contrast phase, the third contrast phase, the fourth contrast phase, and the fifth contrast phase may be one of no contrast, the venous phase, the portal phase, the arterial phase, and the delayed phase. The selected energy transformation model is trained for the single contrast phase included in the image. In one example, the contrast phase classifier may identify that the venous phase is included in the image at the first energy level. As such, the energy transformation model trained for the venous phase is selected from among the first energy transformation model, the second energy transformation model, the third energy transformation model, the fourth energy transformation model, and the fifth energy transformation model.

At 816, the method 800 includes generating the final transformed image at the second energy level by inputting the image and the guide image into the selected energy transformation model, which is trained to output the final transformed image at the second energy level based on the image and the guide image. In some embodiments, the second energy level may be lower than the first energy level. As such, the final transformed image may exhibit increased contrast visibility compared with the image at the first peak energy level. By increasing contrast visibility, the ROI of the subject may have increased visualization, which may reduce the frequency of a missed diagnosis and/or misdiagnosis of the subject.

At 822, the method 800 includes displaying and/or saving the final transformed image. The final transformed image may be displayed using a display device, such as a display device communicatively coupled to an image processing system, which may be the image processing system 302 of FIG. 3. In this way, a medical professional may visually evaluate the content of the final transformed image and determine a diagnosis based on the content of the final transformed image. By transforming an image at the first peak energy level to the second energy level, the medical professional may correctly diagnose the subject more easily since poor contrast visibility does not diminish the image quality and render the image un-diagnostic. Further, the final transformed image may be stored in memory of the image processing system (e.g., non-transitory memory 306 of FIG. 3) or in an image archive such as a PACS to enable a user or the medical professional to access the final transformed image at a later time. The method 800 then ends.

Returning to 810, in response to determining that more than one contrast phase is identified in the image, the method 800 includes selecting an energy transformation model for each identified contrast phase at 814. Different tissues may uptake contrast agent at different rates, which may result in images with multiple contrast phases. For example, some types of tissue (e.g., brain) may be in a different contrast phase than this other types of tissue (e.g. aortic arch). Due to the presence of multiple contrast phases and challenges with mapping tissues in different contrast phases from the first energy level to the second energy level, each energy transformation model is trained for a specific contrast phase and energy transformation (e.g., change in energy level between the initial energy level and the final energy level).

Energy transformation models may be selected for each contrast phase included in the image. Although each selected energy transformation model corresponds to a different contrast phase, each of the selected energy transformation models is trained for the same energy transformation (e.g., same first energy level and second level) according to the method described in FIG. 11. In this way, each contrast phase may be appropriately mapped from the first energy level to the second energy level without diminishing image quality.

As one example, the contrast phase classifier may identify a first contrast phase and a second contrast phase in the image. A first energy transformation model may be selected for the first contrast phase and a second entry transformation model may be selected for the second contrast phase. In this way, pixels corresponding to tissue at the first contrast phase may be mapped from the first energy level to the second energy level separate from pixels corresponding to tissue at the second contrast phase.

At 818, the method 800 includes generating transformed images at the second energy level by inputting the image and a respective guide image into each selected energy transformation model. The image at the first peak energy level and a respective guide image may be entered as input into each of the selected energy transformation models to generate a plurality of transformed images at the second energy level. Each selected energy transformation model may output a transformed image at the second energy level. For example, the first energy transformation model described above may generate a first transformed image at the second energy level based on the image and a first guide image (e.g., the first guide image explained above) and the second energy transformation model may generate a second transformed image at the second energy level based on the image and a second guide image (e.g., the second guide image explained above). By entering the image and a respective guide image to both of the first energy transformation model and the second energy transformation model, pixels corresponding to tissue in the first contrast phase may be mapped separately from pixels corresponding to tissue in the second contrast phase.

At 820, the method 800 includes generating a final transformed image at the second energy level by blending the transformed images. A weighting factor may be applied to each transformed image at the second energy level to blend the transformed images to generate the final transformed image. The weighting factor for each transformed image may be the value for the respective contrast phase output from the contrast phase classifier model.

As an example, the pixels in the first transformed image may be weighted by applying the first value for the first contrast phase to the pixel values of the first transformed image and the pixels in the second transformed image may be weighted by applying the second value for the second contrast phase to the pixel values of the second transformed image and the weighted first transformed image and weighted second transformed image may summed in a pixel-wise manner to generate the final transformed image. Further, in some examples, organ-specific blending may be performed. With the anatomy mask and contrast phase classifier, the contrast phase of a given organ may be determined based on the contrast concentration. An organ-specific contrast map may be produced. For example, several organs may have an intermediate phase (e.g., between two phases), while some organs can belong to a specific phase. Based on the previous blending mechanism, an organ-based blending may be performed to generate the final transformed image. For example, the organ-specific contrast map may indicate that a first organ is in a first contrast phase and a second organ is in a second contrast phase, and the blending may include extracting pixels of the first organ from a first transformed image, extracting pixels of the second organ from a second transformed image, and forming the final transformed image from the extracted pixels. Although the examples provided included the two contrast phases (e.g. the first contrast phase and the second contrast phase) the method 800 may be applied to images wherein more than two contrast phases are identified without departing from the scope of the current disclosure.

At 822, the method 800 includes displaying and/or saving the final transformed image. The final transformed image may be displayed on and saved to the systems previously described to enable a medical professional to make a reliable diagnosis. The method 800 then ends.

In some examples, one or more aspects of the method 800 may be executed in response to receiving user input at a user input device and/or executed as part of a scan protocol. In some examples, the image may be transformed to the final transformed image automatically as part of the scan protocol. For example, the scan protocol may dictate that particular images at particular energy level(s) be generated from the projection data obtained during the scan of the subject. In other examples, the image may be transformed to the final transformed image in response to a user request, wherein a user requests transformation of the image by interacting with the user input device. For example, the user may specify which images (e.g., in which scan planes and at what energy level(s)), are to be generated from the projection data obtained during the scan of the subject. In some examples, the user may initially view the image and request, upon viewing the image, that the image be transformed to the final transformed image in order to increase visibility of the contrast agent. Thus, in some examples, the image may be displayed on a display device prior to transformation and generation of the final transformed image. However, in other examples, the image may not be displayed on the display device prior to using the image to generate the final transformed image. In such examples, the image may be generated solely for the purpose of generating the final transformed image. Further, in some examples, the image at the first peak energy level may be displayed alongside the final transformed image at the second energy level.

FIG. 9 illustrates a comparison 900 of regression datasets used to generate functions for regression models that differentiate pixel intensity values based on tissue type. The comparison 900 further includes a graph 902 that includes a single regression dataset for a plurality of tissue types. The regression dataset may be used to map pixel intensity values at a first energy level (e.g., 70 keV) to corresponding pixel intensity values at a second energy level (50 keV). The regression dataset is not differentiated based on tissue type. Mapping pixel intensity values of pixels included in a region 908 of a first image 906 at the first energy level and a second image 910 at the second energy level may be challenging since the regression dataset is not differentiated based on tissue type. As appreciated by area 909 of graph 902, the pixel intensity values within region 908 of the first image 906 map to a large range of pixel intensity values for the second energy level. If a single regression were to be performed on the regression dataset of graph 902 to form a single function (e.g., to fit a line to the regression dataset), the transformation performed with the function may not accurately map pixel intensity values and different contrast levels of different tissues may be masked.

The comparison 900 further includes a graph 904 that includes a plurality of regression datasets wherein each regression dataset corresponds to regression data for a particular tissue type, such as fat tissue, aorta tissue, femur tissue, heart tissue, iliac tissue, kidney tissue, liver tissue, lung tissue, spleen tissue, and vertebrae tissue. Some of the plurality of regression datasets may correspond to the different tissue types included identified in a segmented image 912. When compared with the graph 904, more accurate functions may be generated (e.g., by fitting separate curves to each regression dataset). As such, mapping pixel intensity values included in the first image 906 to corresponding pixel intensity values included in the second image 910 may be performed with increased accuracy when separate, tissue-specific functions are generated from separate, tissue-specific regression datasets.

Figure 10:
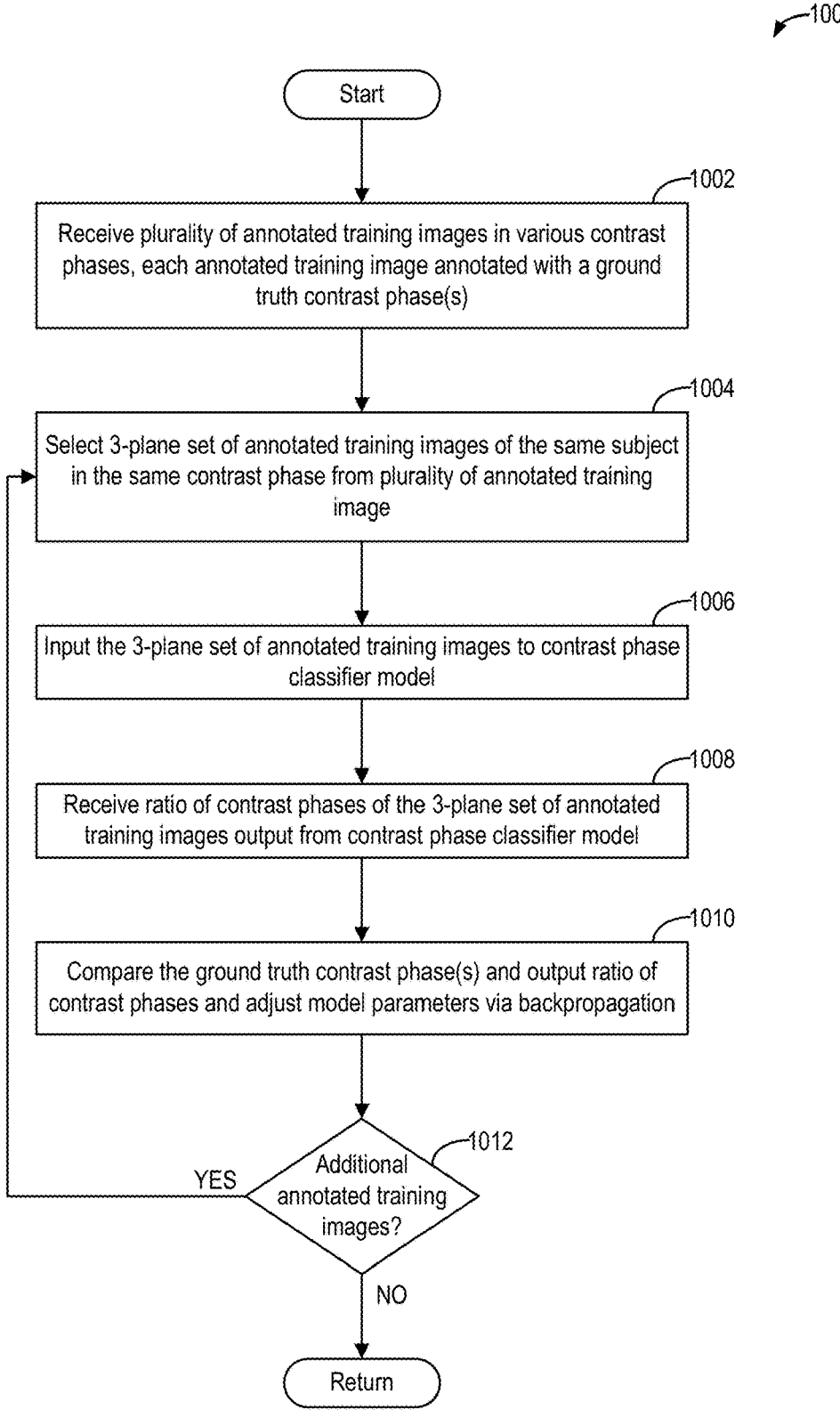
FIG. 10 is a flow chart illustrating a method for training a contrast phase classifier, according to embodiments of the present disclosure.

Referring now to FIG. 10, a flowchart is shown of a method 1000 for training a contrast phase classifier model. The contrast phase classifier model may be a non-limiting example of the contrast phase classifier model 404 of the process 600 of FIG. 6, according to an embodiment. In some embodiments, the contrast phase classifier model may be a deep neural network with a plurality of hidden layers. Method 1000 may be executed by a processor of an image processing system, such as the image processing system 302 of FIG. 3. Method 1000 may be carried out according to instructions stored in non-transitory memory of the image processing system (e.g., in a training module such as the training module 318 of the image processing system 302 of FIG. 3) and executed by a processor of the image processing system (e.g., the processor 304 of image processing system 302 of FIG. 3).

The contrast phase classifier model may be trained on training data comprising a plurality of training triads. Each training triad may comprise a set of projection images generated from a 3D volume, for example. The set of projection images may include a first annotated maximum intensity projection (MIP) image in a first scanning plane, a second annotated MIP image in a second scanning plane, and a third annotated MIP image in a third scanning plane, as described below. In some embodiments, the plurality of training triads may be stored in a projection/image database of an image processing system, such as the projection/image database 320 of image processing system 302 of FIG. 3. It is to be appreciated that in a given triad, each MIP image is of the same subject and at the same contrast phase(s).

At 1002, the method 1000 includes receiving a plurality of annotated training images in various contrast phases, each annotated training image annotated with a ground truth contrast phase(s). The plurality of annotated training images may be acquired with a CT imaging system, such as CT imaging system 100 of FIG. 1. The plurality of annotated training images may be stored in a projection/image database of an image processing system (e.g., FIG. 3). The plurality of annotated training images may be images of one or more regions of interest (ROI) of one or more subjects, such as a brain, spine, and the like. In some embodiments, the plurality of annotated training images may be a plurality of annotated maximum intensity projection (MIP) images, wherein the plurality of annotated MIP images is sorted into a plurality of 3-plane sets of annotated MIP images in different scanning planes. In comparison to other types of 3D renderings of projection data for viewing contrast images, contrast is accentuated in MIP images. By training the contrast phase classifier model on MIP images, the contrast phase classifier may identify contrast phases with greater accuracy.

More specifically, each set of 3-plane annotated training MIP images may include a first annotated MIP training image in a first scanning plane, a second annotated MIP training image in a second scanning plane, and a third annotated MIP training image in a third scanning plane. In some embodiments, the first scanning plane may be a sagittal plane, the second scanning plane may be a coronal plane, and the third scanning plane may be an axial plane. In this way, the contrast phase classifier model may be trained to identify contrast phases of the ROI in an image regardless of an orientation/view plane of the ROI within the image.

Different sets of 3-plane annotated training MIP images may include different subjects and/or different ROIs. In an example, a first set of 3-plane annotated training MIP images may include a first subject for a first ROI, wherein the first ROI is a brain in different scanning planes. A second set of 3-plane annotated training MIP images may include a second subject for the first ROI in different scanning planes, the first subject being different than the second subject. In another example, a third set of 3-plane images may include the first subject in a second ROI, wherein the second ROI is a chest in different scanning plans.

Each annotated MIP training image in each set of 3-plane annotated training images may have a respective annotation wherein each respective annotation includes a contrast phase(s) included in the respective annotated MIP training image. The respective annotation may be considered the ground truth annotation. As such, the contrast phase classifier model may be trained to recognize contrast phases for different ROI for different subjects.

At 1004, the method 1000 includes selecting one 3-plane set of annotated training images of the same subject in the same contrast phase (e.g., a training triad) from the plurality of annotated training images. Instructions configured, stored, and executed in memory by a processor may cause the processor to randomly select one 3-plane set of annotated training images from the plurality of annotated training images.

The selected training triad may include the first set of 3-plane annotated training MIP images for the first subject described above. In some embodiments, the first set of 3-plane annotated training MIP images may include a first contrast phase and a second contrast phase. The first contrast phase is different than the second contrast phase. As an example, the first contrast phase may be in the venous phase and the second contrast phase may be in the portal phase. Accordingly, each of the annotated training MIP images includes an annotation indicating that the image includes tissue in the venous phase and tissue in the portal phase.

In some embodiments, the selected training triad may include annotated training MIP images wherein the annotation includes different combinations of no contrast, venous phase, portal phase, arterial phase, and delayed phase depending on the timing after administration of a contrast agent and uptake rate of different tissues. In one example, when the ROI is a brain of a subject instead of a chest of the subject, brain tissue may have different uptake rates than lung tissue. Accordingly, an image of the brain may include a different number of contrast phases than the chest since it includes different types of tissues.

At 1006, the method 1000 includes inputting the 3-plane set of annotated training images to the contrast phase classifier model. Instructions configured, stored, and executed in a training module by one or more processors of the image processing system described above with respect to FIG. 3 may cause the 3-plane set of annotated MIP training images be entered as input into the contrast phase classifier model.

At 1008, the method 1000 includes receiving a ratio of contrast phases of the 3-plane set of annotated training images output from the contrast phase classifier model. For example, the annotations of the 3-plane set of annotated training images may include a value for each possible contrast phase, ranging from 0 to 1 for example (or another suitable range), with 0 indicating the lowest likelihood and 1 indicating the highest likelihood that the image includes that contrast phase. The contrast phase classifier model may thus output a respective value for each possible contrast phase, indicating the likelihood/probability that the input images include each contrast phase.

At 1010, the method 1000 includes comparing the ground truth contrast phase(s) and output ratio of contrast phases to determine a loss/cost function and adjusting model parameters of the contrast phase classifier model via backpropagation based on the loss/cost function. For example, a loss function may be calculated for each possible contrast phase based on the value output by the contrast phase classifier model for that contrast phase and the ground truth value for that contrast phase. The loss functions (e.g., one for each contrast phase) may be summed to form a cost function that is used to update the parameters of the contrast phase classifier model.

At 1012, the method 1000 includes determining whether additional annotated training images remain in the plurality of annotated training images. In some embodiments, a total number of sets of 3-plane annotated training MIP images of the plurality of annotated training images stored in projection/image database may be determined with the training module at the beginning of an epoch. Instructions configured, stored, and executed in the training module by the processor may cause the processor to determine the number of sets of 3-plane annotated training MIP images that are input into the contrast phase classifier DL model. In this way, the training module may monitor the number of sets of 3-plane annotated training MIP images that are used to train the contrast phase classifier DL model compared to the total number of sets of 3-plane annotated training MIP images. If additional annotated training images remain (e.g., training is not complete), method 1000 returns to 1004 to select the next 3-plane set of annotated images for training. Otherwise, the method 1000 ends.

Figure 11:
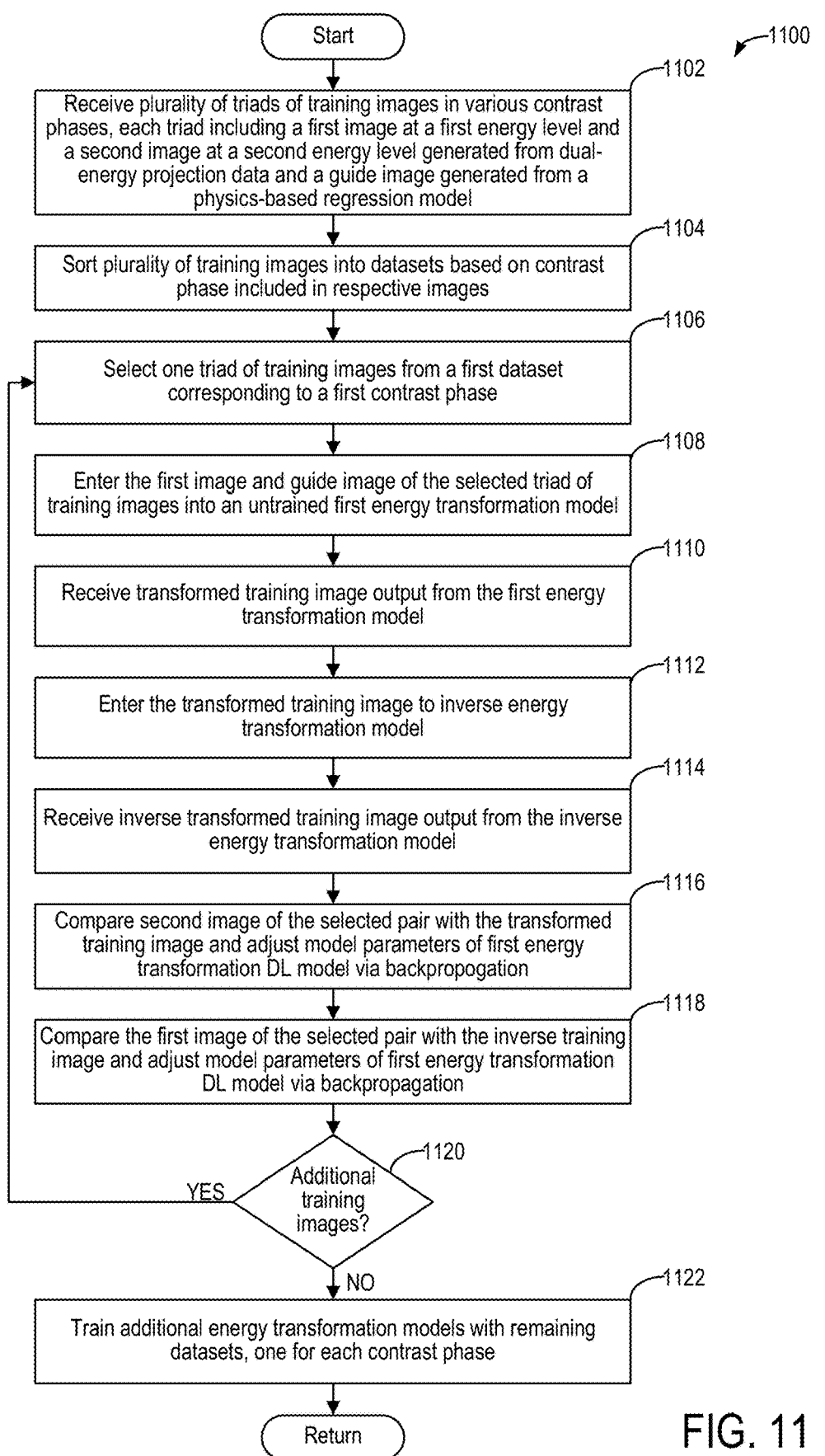
FIG. 11 is a flow chart illustrating a method for training an energy transformation model, according to embodiments of the present disclosure.

Referring now to FIG. 11, a flowchart is shown of a method 1100 for training an energy transformation model. The energy transformation model may be a non-limiting example of the energy transformation model 716 of the process 700 of FIG. 7, according to an embodiment. In some embodiments, the energy transformation model may be a deep neural network with a plurality of hidden layers. Method 1100 may be executed by a processor of an image processing system, such as the image processing system 302 of FIG. 3. Method 1100 may be carried out according to instructions stored in non-transitory memory of the image processing system (e.g., in a training module such as the training module 318 of the image processing system 302 of FIG. 3) and executed by a processor of the image processing system (e.g., the processor 304 of image processing system 302 of FIG. 3). The energy transformation model may be trained on training data comprising one or more sets of triads. Each triad of the one or more sets of triads may comprise one image at a first energy level and another image at a second energy level, as described below. In some embodiments, the one or more sets of triads may be stored in a projection/image database of an image processing system, such as the projection/image database 320 of image processing system 302 of FIG. 3.

At 1102, the method 1100 includes receiving a plurality of triads of training images in various contrast phases, each triad including a first image at the first energy level and a second image at the second energy level generated from dual-energy projection data (e.g., the first image and the second image may each be a monochromatic image), and a guide image at the second energy level generated from the first image with a regression model according to the embodiments described herein. The dual-energy projection data may be obtained at two peak energy levels, such as 40 kVp and 140 kVp, in an interleaved manner (e.g., fast-kVp switching) or via two successive scans. For each acquisition/ set of dual-energy projection data, the two training images may be generated, such as by reconstructing material basis images and then performing linear combinations of the material basis images to obtain the first image at the first energy level and the second image at the second energy level.

At 1104, the method 1100 includes sorting a plurality of training images into datasets based on a contrast phase included in the respective images. For example, all training images acquired during a first contrast phase are included in a first dataset, all training images acquired during a second contrast phase are included in a second dataset, etc. Thus, five separate training datasets may be formed, with each training dataset including a plurality of training triads of images (e.g., with each triad including a guide image at a second energy level, a first image at a first energy level, and a second image at a second energy level). In some examples, at least some of the datasets may include images with more than one contrast phase. For example, the first dataset may include some image pairs that only include the first contrast phase and other image pairs that include the first contrast phase and the second contrast phase. Image pairs acquired during a mixed contrast phase may be included in more than one dataset, e.g., an image pair acquired during the transition from the first contrast phase to the second contrast phase may be included in both the first dataset and the second dataset. In this way, each energy transformation model may be trained to perform energy transformations for both single-contrast phase images and mixed-contrast phase images, which may ensure all cases (including boundary cases) are covered.

At 1106, the method 1100 includes selecting one triad of training images from a first dataset corresponding to a first contrast phase, and, at 1108, entering a first image of the selected triad of training images and the guide image of the selected triad into an untrained first energy transformation model. The first image may be at the first energy level, such as 70 keV.

At 1110, the method 1100 includes receiving a transformed training image output from the first energy transformation model. The transformed training image may be a transformed version of the first image intended to appear as if obtained at the second energy level.

At 1112, the method 1100 includes entering the transformed training image to an inverse energy transformation model. The inverse energy transformation model may be configured to re-transform the transformed training image back to the first energy level. At 1114, the method 1100 includes receiving an inverse transformed training image output from the inverse transformation model.

At 1116, the method 1100 includes comparing the second image of the selected triad with the transformed training image and adjusting model parameters of the first energy transformation model via backpropagation based on the comparison. For example, a first loss function may be determined based on the transformed training image and the second image of the selected triad and the first loss function may be used to update the parameters of the first energy transformation model.

At 1118, the method 1100 includes comparing the first image of the selected triad with the inverse training image and adjusting model parameters of the first energy transformation model via backpropagation based on the comparison. For example, a second loss function may be determined based on the inverse training image and the first image of the selected triad and the second loss function may be used, in conjunction with the first loss function, to update the parameters of the first energy transformation model. Additionally, the second loss function may be used to update the parameters of the inverse transformation model. In some examples, the first energy transformation model and the inverse transformation model may be initialized with the same parameters. As training proceeds and the parameters of the first energy transformation model are updated based on each first loss function and each second loss function, the first energy transformation model may be trained to produce transformed images at the second energy level that can likewise be transformed back to the first energy level. The parameters of the inverse transformation model may be updated based on each second loss function (but not first loss function), such that the inverse transformation model learns to transform images from the second energy level to the first energy level. This forward-backward training ensures data and cyclic consistency, such that for every location in the image, the transformation $\mu(E_1) \rightarrow \mu(E_2) \rightarrow \mu(E_1)$ holds. This restricts the forward transformations and discourages any unwanted behavior at each voxel neighborhood. For example, the forward-backward training preserves structural integrity and discourages tissue or contrast mixing across voxels. With regards to the cyclic consistency, the second image is subjected to constraints to reduce or prevent deviation in terms of geometric and tissue (Hu) integrity, as that would impede the inverse transform. At 1120, the method 1100 includes determining whether additional training images remain in the plurality of training images. As explained above, the first dataset may include a plurality of triads of training images that may be used to train the first energy transformation model. If less than all the triads of training images in the first dataset have been selected and used to train the first energy transformation model (e.g., at least some training images remain), or if the first energy transformation model is otherwise determined to not be fully trained, method 1100 returns to 1106 to select a next triad of training images from the first dataset and use the next triad of training images to train the first energy transformation model. However, if at 1120 it is determined that each triad of training images has been selected and used to train the first energy transformation model (and no more training images remain), or if the first energy transformation model is otherwise determined to be fully trained, method 1100 proceeds to 1122, which includes training additional energy transformation models with remaining datasets, one for each contrast phase. Thus, the method may be repeated for each dataset in order to train a plurality of different energy transformation models. The method 1100 then returns.

Figure 12:
FIGS. 12-17 show example images at various energy levels and generated according to the disclosed embodiments.
Figure 12:
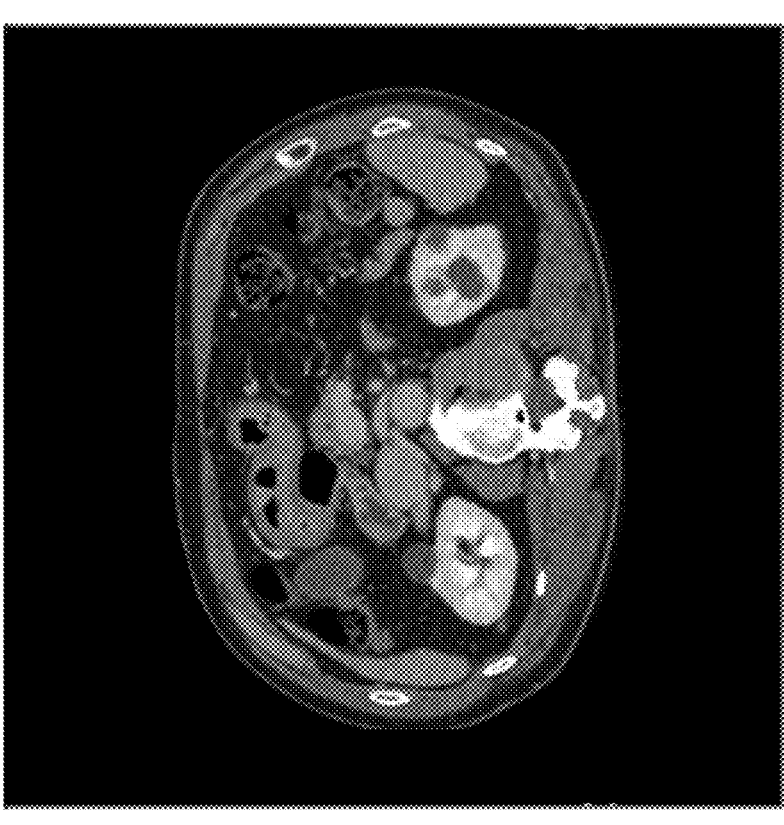
Figure 13:
Figure 13:
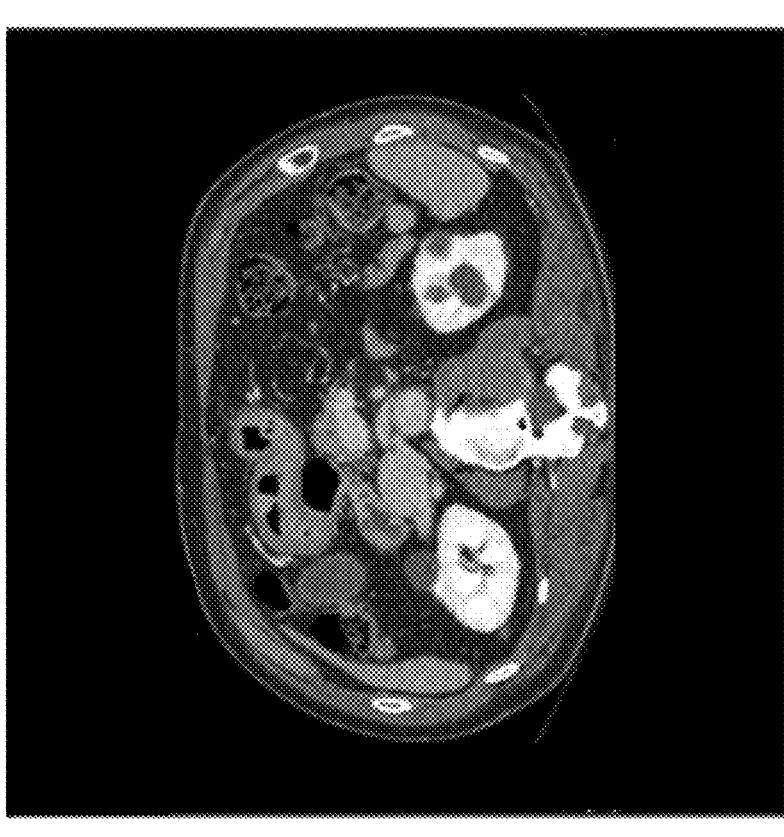
Figure 14:
Figure 14:
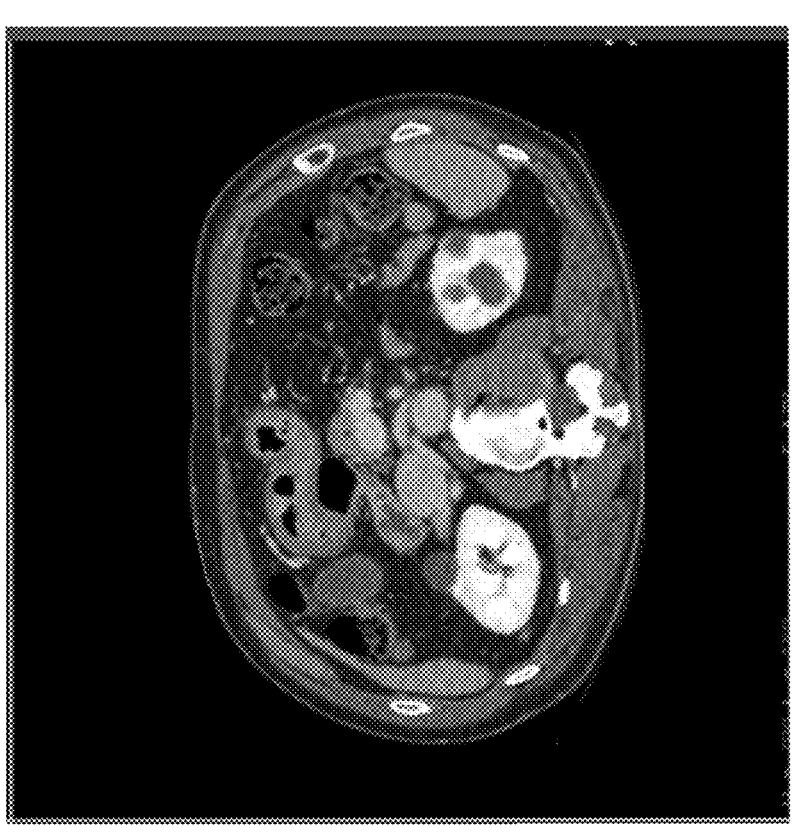

FIGS. 12-14 show example contrast images of a subject in a delayed phase according to embodiments of the disclosure. The images shown in FIGS. 12-14 are contrast-enhanced axial images of a lower abdomen of the subject obtained during the delayed phase of contrast. FIG. 12 illustrates a first example image 1200 of a subject reconstructed from projection data obtained at two energy levels (e.g., 40 kVp and 140 kVp). The first example image 1200 may be an image at a first energy level of 70 keV formed by a first linear combination of material basis images reconstructed from the projection data. FIG. 13 is a second example image 1300 of the subject, reconstructed from the same dual-energy projection data as the first example image 1200, but being an image at a second energy level of 50 keV formed by a second linear combination of the material basis images. As such, the second example image 1300 may be a ground truth image and the first example image 1200 and the second example image 1300 may be an example of a pair of images that may be used to train an energy transformation model to transform images from the first energy level to the second energy level. FIG. 14 includes a third example image 1400 at the second energy level of 50 keV generated according to the embodiments described herein. Specifically, the third example image 1400 may be generated by entering the first example image 1200 and a guide image generated from the first example image 1200 as input to a trained energy transformation model. As appreciated by FIGS. 12-14, the transformed image (e.g., the third example image 1400) has improved contrast detectability relative to the original higher energy image (e.g., the first example image 1200) and similar to the target lower energy image (e.g., the second example image 1300). Additionally, the transformed image may have lower noise and artifacts compared to an image acquired at the target energy (e.g., an image acquired at 50 keV).

Figure 15:
Figure 16:
Figure 16:
Figure 17:
Figure 17:

FIGS. 15-17 show additional example contrast images of a subject in an arterial phase according to embodiments of the disclosure. The images shown in FIGS. 15-17 are contrast-enhanced axial images of an upper abdomen of the subject obtained during the arterial phase of contrast. FIG. 15 illustrates a first example image 1500 of the subject reconstructed from projection data obtained at two energy levels (e.g., 40 kVp and 140 kVp). The first example image 1500 may be an image at a first energy level of 70 keV formed by a first linear combination of material basis images reconstructed from the projection data. FIG. 16 is a second example image 1600 of the subject, reconstructed from the same dual-energy projection data as the first example image 1500, but being an image at a second energy level of 50 keV formed by a second linear combination of the material basis images. As such, the second example image 1600 may be a ground truth image and the first example image 1500 and the second example image 1600 may be an example of a pair of images that may be used to train an energy transformation model to transform images from the first energy level to the second energy level. FIG. 17 includes a third example image 1700 at the second energy level of 50 keV generated according to the embodiments described herein. Specifically, the third example image 1700 may be generated by entering the first example image 1500 and a guide image generated from the first example image 1500 as input to a trained energy transformation model. As appreciated by FIGS. 15-17, the transformed image (e.g., the third example image 1700) has improved contrast detectability relative to the original higher energy image (e.g., the first example image 1500) and similar to the target lower energy image (e.g., the third example image 1400). Additionally, the transformed image may have lower noise and artifacts compared to an image acquired at the target energy (e.g., an image acquired at 50 keV).

A technical effect of transforming an image from a first energy level to a second energy level using a regression model that generates a guide image and an energy transformation model selected based on a contrast phase of the image (and specifically trained to specific to the contrast phase) is that the transformation may be performed in a contrast-aware manner in order to generate an image at a desired energy level to improve contrast detectability while avoiding noise and artifact issues. Doing so may allow images at desired energy level(s) to be obtained even if projection data acquired at only a single peak energy level is available, thereby avoiding the need for additional imaging systems. Additionally, by using a guide image, tissue-specific transformations may be performed that may result in more accurate and realistic looking transformed images. Guide images provide an organ-wise transform initialization. For each organ in the volume, contrast behavior as well as tissue attenuation changes with respect to energy and varies non-uniformly. In the organ map-based approach described herein, the guide image is generated using a known regression for each of the anatomies and tissue types separately. The initialization enables the energy transformation models to more easily achieve a desired energy level. As such, the energy transformation models may achieve a larger transformation of energy without experiencing diminished image quality.

The disclosure also provides support for a method, comprising: obtaining an image at a first energy level acquired with a single-energy computed tomography (CT) imaging system, identifying a contrast phase of the image, entering the image as input to a segmentation model trained to output an anatomy mask that identifies each tissue type in the image, generating a guide image from the image and the anatomy mask using a regression model, the regression model selected from among a plurality of regression models based on the contrast phase, entering the image and the guide image as input into an energy transformation model trained to output a transformed image at a second energy level, different than the first energy level, the energy transformation model selected from among a plurality of energy transformation models based on the contrast phase, and displaying a final transformed image and/or saving the final transformed image in memory, wherein the final transformed image is the transformed image or is generated based on the transformed image. In a first example of the method, generating the guide image from the image and the anatomy mask using the regression model comprises mapping, with the regression model, each pixel intensity of the image to a corresponding pixel intensity corresponding to the second energy level, with a different mapping performed for each tissue type as identified in the anatomy mask. In a second example of the method, optionally including the first example, identifying the contrast phase of the image comprises identifying the contrast phase of the image with a contrast phase classifier, the contrast phase classifier comprising a deep learning model trained with a plurality of training triads, each training triad including a set of projection images generated from a 3D volume of a subject. In a third example of the method, optionally including one or both of the first and second examples, each set of projection images includes a first annotated maximum intensity projection (MIP) training image in a first scanning plane, a second annotated MIP training image in a second scanning plane, and a third annotated MIP training image in a third scanning plane. In a fourth example of the method, optionally including one or more or each of the first through third examples, a respective annotation of each annotated MIP training image indicates a contrast phase included in that annotated MIP training image. In a fifth example of the method, optionally including one or more or each of the first through fourth examples, the energy transformation model is trained with triads of training image, each triad of training images including a first training image at the first energy level, a second training image at the second energy level, and a training guide image at the second energy level generated from the first training image and the regression model, and wherein the first training image and the second training image are monochromatic images acquired with a dual-energy CT imaging system. In a sixth example of the method, optionally including one or more or each of the first through fifth examples, the contrast phase is a first contrast phase and wherein identifying the contrast phase of the image comprises identifying the first contrast phase and a second contrast phase of the image and a ratio of the first contrast phase relative to the second contrast phase. In a seventh example of the method, optionally including one or more or each of the first through sixth examples, the regression model is a first regression model, and wherein generating the guide image from the image and the anatomy mask using the first regression model comprises generating a first guide image from the image and the anatomy mask using the first regression model and generating a second guide image from the image and the anatomy mask using a second regression model, the second regression model selected from among the plurality of regression models based on the second contrast phase, and wherein the first guide image is input to the energy transformation model. In an eighth example of the method, optionally including one or more or each of the first through seventh examples, the energy transformation model is a first energy transformation model and the transformed image is a first transformed image, and further comprising entering the image and the second guide image as input to a second energy transformation model trained to output a second transformed image at the second energy level, the second energy transformation model selected from among the plurality of energy transformation models based on the second contrast phase, and blending the first transformed image and the second transformed image to generate the final transformed image. In a ninth example of the method, optionally including one or more or each of the first through eighth examples, the blending comprises weighting the first transformed image and the second transformed image based on the ratio of the first contrast phase relative to the second contrast phase.

The disclosure also provides support for a system, comprising: one or more processors, and memory storing instructions executable by the one or more processors to: obtain an image at a first energy level, the image reconstructed from projection data acquired at a single peak energy level, identify a contrast phase of the image with a contrast phase classifier model, enter the image as input to a segmentation model trained to output an anatomy mask that identifies each tissue type in the image, generate a guide image from the image and the anatomy mask using a regression model, the regression model selected from among a plurality of regression models based on the contrast phase, enter the image and the guide image as input into an energy transformation model trained to output a transformed image at a second energy level, different than the first energy level, the energy transformation model selected from among a plurality of energy transformation models based on the contrast phase, and display a final transformed image and/or save the final transformed image in memory, wherein the final transformed image is the transformed image or is generated based on the transformed image. In a first example of the system, the contrast phase comprises one or more of no contrast, a venous phase, a portal phase, an arterial phase, and a delayed phase. In a second example of the system, optionally including the first example, the first energy level is greater than the second energy level. In a third example of the system, optionally including one or both of the first and second examples, the regression model is configured to perform tissue-type specific mapping of pixel intensity values from the image to corresponding pixel intensity values corresponding to the second energy level, wherein the guide image comprises the corresponding pixel intensity values. In a fourth example of the system, optionally including one or more or each of the first through third examples: the anatomy mask identifies a first tissue type and a second tissue type in the image, the regression model is configured to perform a first mapping of first pixel intensity values of pixels in the image identified as the first tissue type to first corresponding pixel intensity values corresponding to the second energy level, and the regression model is configured to perform a second mapping of second pixel intensity values of pixels in the image identified as the second tissue type to second corresponding pixel intensity values corresponding to the second energy level.

The disclosure also provides support for a method, comprising: obtaining an image of a subject at a first energy level, the image reconstructed from projection data acquired with a single-energy computed tomography (CT) imaging system, identifying a first contrast phase and a second contrast phase in the image with a contrast phase classifier, entering the image as input to a segmentation model trained to output an anatomy mask that identifies each tissue type in the image, selecting a first regression model for the first contrast phase and a second regression model for the second contrast phase, generating a first guide image from the image and the anatomy mask using the first regression model, generating a second guide image from the image and the anatomy mask using the second regression model, selecting a first energy transformation model for the first contrast phase and a second energy transformation model for the second contrast phase, entering the image and the first guide image as input to the first energy transformation model and entering the image and the second guide image as input to the second energy transformation model, each of the first energy transformation model and the second energy transformation model trained to output a respective transformed image at a second energy level based on the image at the first energy level and the respective guide image, blending each respective transformed image to form a final transformed image at the second energy level, and displaying the final transformed image on a display device and/or saving the final transformed image in memory. In a first example of the method, the first energy transformation model outputs a first transformed image at the second energy level and the second energy transformation model outputs a second transformed image at the second energy level, wherein the contrast phase classifier model outputs a ratio of the first contrast phase relative to the second contrast phase, and wherein the blending of the first transformed image and the second transformed image comprises weighting the first transformed image and the second transformed image based on the ratio. In a second example of the method, optionally including the first example, the contrast phase classifier comprises a deep learning model trained with a plurality of training triads, each training triad including a set of projection images generated from a 3D volume. In a third example of the method, optionally including one or both of the first and second examples, each energy transformation model is trained with triads of training images, each triad of training images including a first training image at the first energy level, a second training image at the second energy level, and a training guide image, and wherein the first training image and the second training image are monochromatic images acquired with a dual-energy CT imaging system. In a fourth example of the method, optionally including one or more or each of the first through third examples, the first contrast phase and the second contrast phase are each one of no contrast, a venous phase, a portal phase, an arterial phase, and a delayed phase.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   obtaining an image at a first energy level acquired with a single-energy computed tomography (CT) imaging system;
   identifying a contrast phase of the image;
   entering the image as input to a segmentation model trained to output an anatomy mask that identifies each tissue type in the image;
   generating a guide image from the image and the anatomy mask using a regression model, the regression model selected from among a plurality of regression models based on the contrast phase;
   entering the image and the guide image as input into an energy transformation model trained to output a transformed image at a second energy level, different than the first energy level, the energy transformation model selected from among a plurality of energy transformation models based on the contrast phase; and
   displaying a final transformed image and/or saving the final transformed image in memory, wherein the final transformed image is the transformed image or is generated based on the transformed image.

2. The method of claim 1, wherein generating the guide image from the image and the anatomy mask using the regression model comprises mapping, with the regression model, each pixel intensity of the image to a corresponding pixel intensity corresponding to the second energy level, with a different mapping performed for each tissue type as identified in the anatomy mask.

3. The method of claim 1, wherein identifying the contrast phase of the image comprises identifying the contrast phase of the image with a contrast phase classifier, the contrast phase classifier comprising a deep learning model trained with a plurality of training triads, each training triad including a set of projection images generated from a 3D volume of a subject.

4. The method of claim 3, wherein each set of projection images includes a first annotated maximum intensity projection (MIP) training image in a first scanning plane, a second annotated MIP training image in a second scanning plane, and a third annotated MIP training image in a third scanning plane.

5. The method of claim 4, wherein a respective annotation of each annotated MIP training image indicates a contrast phase included in that annotated MIP training image.

6. The method of claim 1, wherein the energy transformation model is trained with triads of training image, each triad of training images including a first training image at the first energy level, a second training image at the second energy level, and a training guide image at the second energy level generated from the first training image and the regression model, and wherein the first training image and the second training image are monochromatic images acquired with a dual-energy CT imaging system.

7. The method of claim 1, wherein the contrast phase is a first contrast phase and wherein identifying the contrast phase of the image comprises identifying the first contrast phase and a second contrast phase of the image and a ratio of the first contrast phase relative to the second contrast phase.

8. The method of claim 7, wherein the regression model is a first regression model, and wherein generating the guide image from the image and the anatomy mask using the first regression model comprises generating a first guide image from the image and the anatomy mask using the first regression model and generating a second guide image from the image and the anatomy mask using a second regression model, the second regression model selected from among the plurality of regression models based on the second contrast phase, and wherein the first guide image is input to the energy transformation model.

9. The method of claim 8, wherein the energy transformation model is a first energy transformation model and the transformed image is a first transformed image, and further comprising entering the image and the second guide image as input to a second energy transformation model trained to output a second transformed image at the second energy level, the second energy transformation model selected from among the plurality of energy transformation models based on the second contrast phase, and blending the first transformed image and the second transformed image to generate the final transformed image.

10. The method of claim 9, wherein the blending comprises weighting the first transformed image and the second transformed image based on the ratio of the first contrast phase relative to the second contrast phase.

11. A system, comprising:
one or more processors; and
memory storing instructions executable by the one or more processors to:
obtain an image at a first energy level, the image reconstructed from projection data acquired at a single peak energy level;
identify a contrast phase of the image with a contrast phase classifier model;
enter the image as input to a segmentation model trained to output an anatomy mask that identifies each tissue type in the image;
generate a guide image from the image and the anatomy mask using a regression model, the regression model selected from among a plurality of regression models based on the contrast phase;
enter the image and the guide image as input into an energy transformation model trained to output a transformed image at a second energy level, different than the first energy level, the energy transformation model selected from among a plurality of energy transformation models based on the contrast phase; and
display a final transformed image and/or save the final transformed image in memory, wherein the final transformed image is the transformed image or is generated based on the transformed image.

12. The system of claim 11, wherein the contrast phase comprises one or more of no contrast, a venous phase, a portal phase, an arterial phase, or a delayed phase.

13. The system of claim 11, wherein the first energy level is greater than the second energy level.

14. The system of claim 11, wherein the regression model is configured to perform tissue-type specific mapping of pixel intensity values from the image to corresponding pixel intensity values corresponding to the second energy level, wherein the guide image comprises the corresponding pixel intensity values.

15. The system of claim 14, wherein:
the anatomy mask identifies a first tissue type and a second tissue type in the image;
the regression model is configured to perform a first mapping of first pixel intensity values of pixels in the image identified as the first tissue type to first corresponding pixel intensity values corresponding to the second energy level; and the regression model is configured to perform a second mapping of second pixel intensity values of pixels in the image identified as the second tissue type to second corresponding pixel intensity values corresponding to the second energy level.

16. A method, comprising:
obtaining an image of a subject at a first energy level, the image reconstructed from projection data acquired with a single-energy computed tomography (CT) imaging system;
identifying a first contrast phase and a second contrast phase in the image with a contrast phase classifier;
entering the image as input to a segmentation model trained to output an anatomy mask that identifies each tissue type in the image;
selecting a first regression model for the first contrast phase and a second regression model for the second contrast phase;
generating a first guide image from the image and the anatomy mask using the first regression model;
generating a second guide image from the image and the anatomy mask using the second regression model;
selecting a first energy transformation model for the first contrast phase and a second energy transformation model for the second contrast phase;
entering the image and the first guide image as input to the first energy transformation model and entering the image and the second guide image as input to the second energy transformation model, each of the first energy transformation model and the second energy transformation model trained to output a respective transformed image at a second energy level based on the image at the first energy level and the respective guide image;
blending each respective transformed image to form a final transformed image at the second energy level; and
displaying the final transformed image on a display device and/or saving the final transformed image in memory.

17. The method of claim 16, wherein the first energy transformation model outputs a first transformed image at the second energy level and the second energy transformation model outputs a second transformed image at the second energy level, wherein the contrast phase classifier model outputs a ratio of the first contrast phase relative to the second contrast phase, and wherein the blending of the first transformed image and the second transformed image comprises weighting the first transformed image and the second transformed image based on the ratio.

18. The method of claim 16, wherein the contrast phase classifier comprises a deep learning model trained with a plurality of training triads, each training triad including a set of projection images generated from a 3D volume.

19. The method of claim 16, wherein each energy transformation model is trained with triads of training images, each triad of training images including a first training image at the first energy level, a second training image at the second energy level, and a training guide image, and wherein the first training image and the second training image are monochromatic images acquired with a dual-energy CT imaging system.

20. The method of claim 16, wherein the first contrast phase and the second contrast phase are each one of no contrast, a venous phase, a portal phase, an arterial phase, or a delayed phase.

* * * * *